United States Patent
Sekiguchi et al.

(10) Patent No.: US 7,496,014 B2
(45) Date of Patent: Feb. 24, 2009

(54) OPTICAL INFORMATION RECORDING APPARATUS AND METHOD AND PROCESSING CIRCUIT

(76) Inventors: Mitsuo Sekiguchi, 5607-2, Nakamuroda Haruna-Machi, Gunma-gun, Gunma 370-3347 (JP); Hiroya Kakimoto, 5607-2, Nakamuroda Haruna-Machi, Gunma-Gun, Gunma 370-3347 (JP); Isao Matsuda, 5607-2, Nakamuroda Haruna-Machi, Gunma-Gun, Gunma 370-3347 (JP); Yoshikazu Sato, 5607-2, Nakamuroda Haruna-Machi, Gunma-Gun, Gunma 370-3347 (JP)

( * ) Notice: Subject to any disclaimer, the term of this patent is extended or adjusted under 35 U.S.C. 154(b) by 618 days.

(21) Appl. No.: 11/181,720

(22) Filed: Jul. 13, 2005

(65) Prior Publication Data
US 2006/0018226 A1   Jan. 26, 2006

(30) Foreign Application Priority Data
Jul. 14, 2004  (JP) ............................. 2004-207248

(51) Int. Cl.
*G11B 7/00*  (2006.01)
(52) U.S. Cl. .................................. 369/47.53
(58) Field of Classification Search ............... 369/47.53, 369/47.5, 116, 59.11
See application file for complete search history.

(56) References Cited

U.S. PATENT DOCUMENTS

| 6,958,962 B2 * | 10/2005 | Ogawa ..................... 369/47.53 |
| 7,068,579 B2 * | 6/2006 | Tasaka et al. ............ 369/59.24 |
| 2003/0151994 A1 | 8/2003 | Tasaka et al. |
| 2004/0008594 A1 | 1/2004 | Tokita et al. |

FOREIGN PATENT DOCUMENTS

| JP | 4-137224 | 5/1992 |
| JP | 5-144001 | 6/1993 |
| JP | 2003-30837 | 1/2003 |
| JP | 2003-203343 | 11/2003 |
| WO | WO 99/30316 | 6/1999 |
| WO | WO 02/089123 | * 11/2002 |
| WO | WO 2005/003878 A1 | 4/2005 |

* cited by examiner

*Primary Examiner*—Thang V Tran
(74) *Attorney, Agent, or Firm*—Knobbe Martens Olson & Bear LLP

(57) ABSTRACT

A condition of a recording pulse comprising a top pulse and a following pulse is determined in a predetermined order. In some embodiments, an mT pulse condition is first determined by test recordings with various power and pulse conditions, involving an inspection of recording quality; then an m'T/(n−m)T ratio is determined by test recording under the mT pulse condition fixed; and finally an nT pulse is configured based on the ratio. A phase shift can be corrected by test recording with the nT pulse.

7 Claims, 24 Drawing Sheets

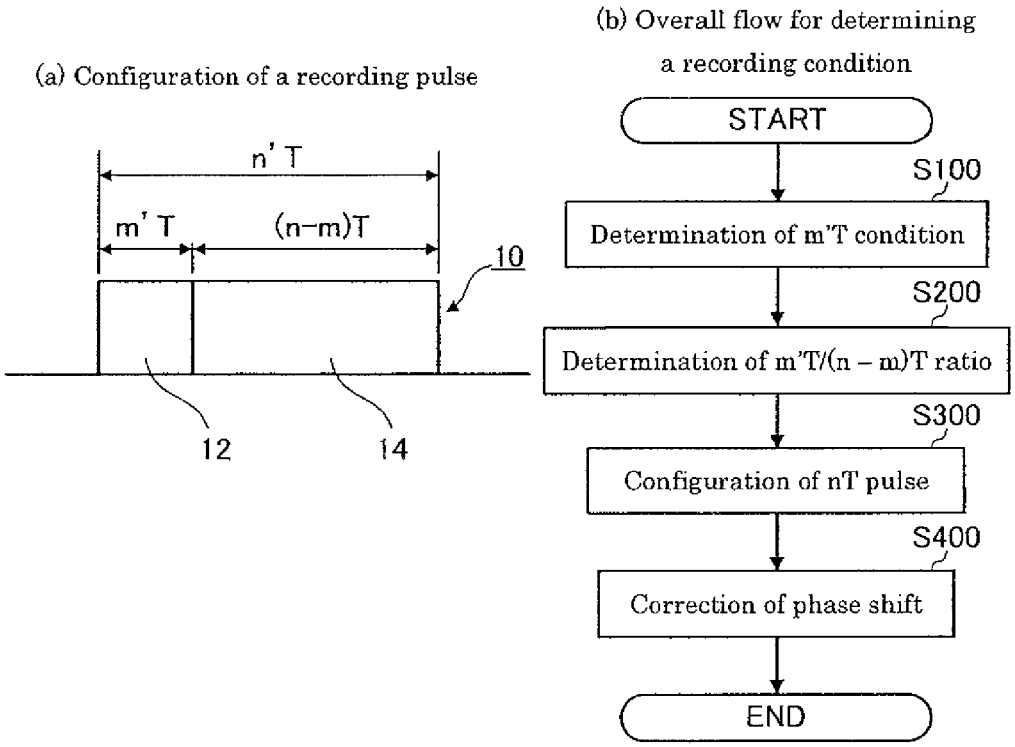
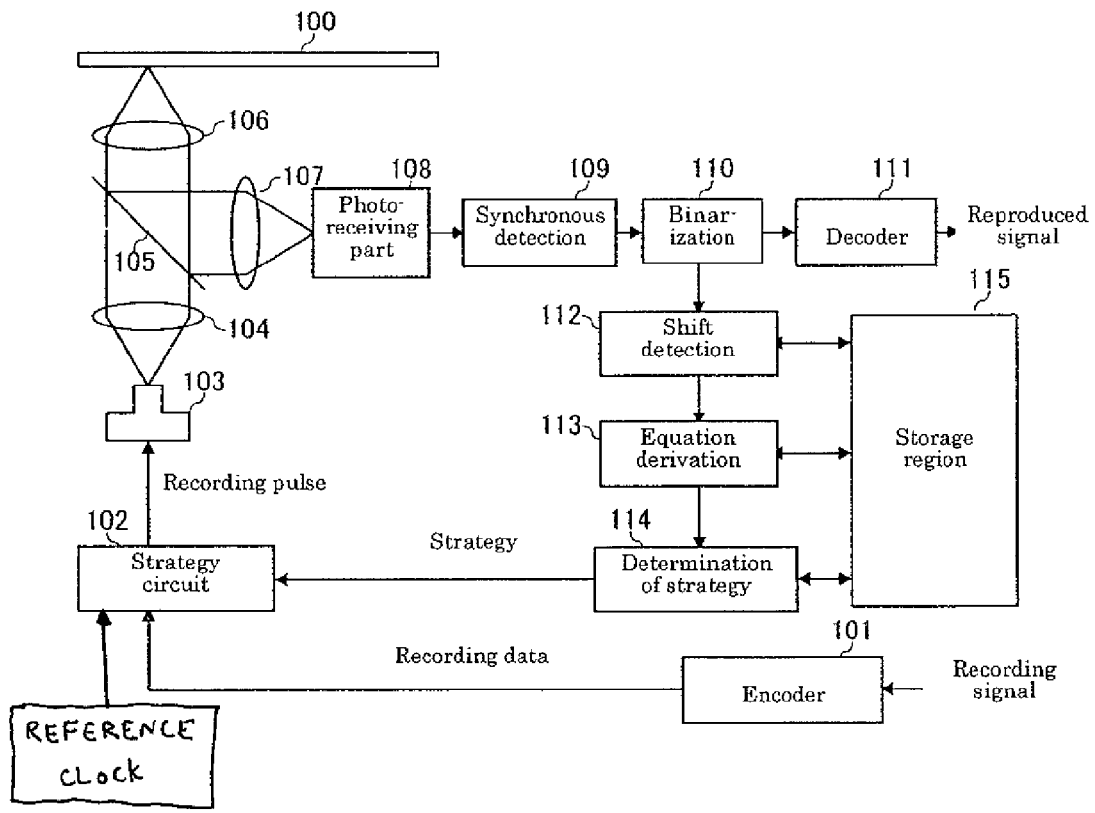

FIGURE 5
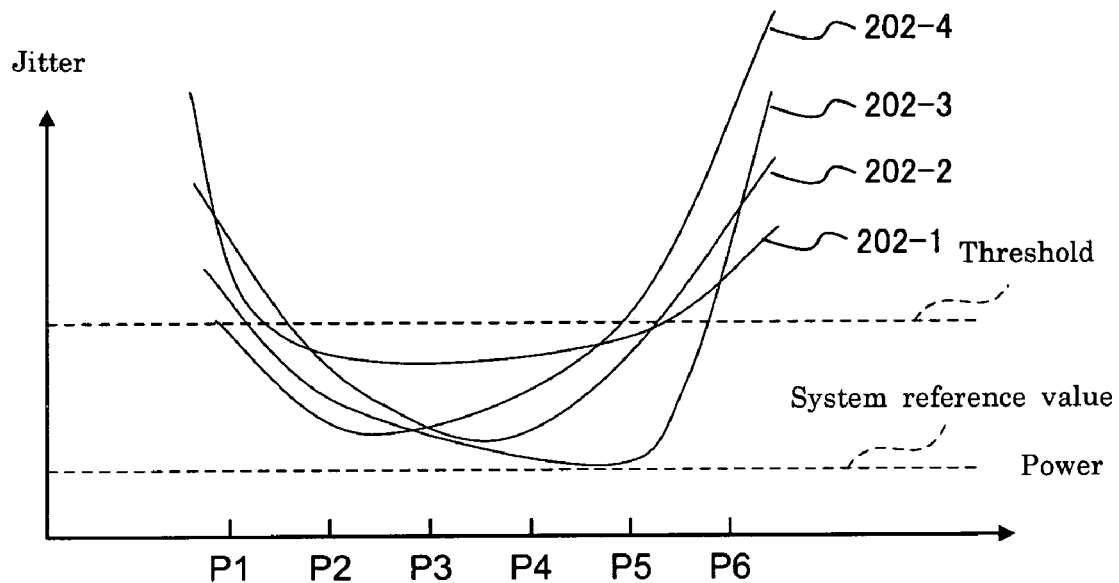
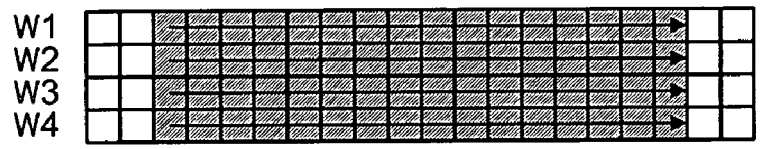
FIGURE 6
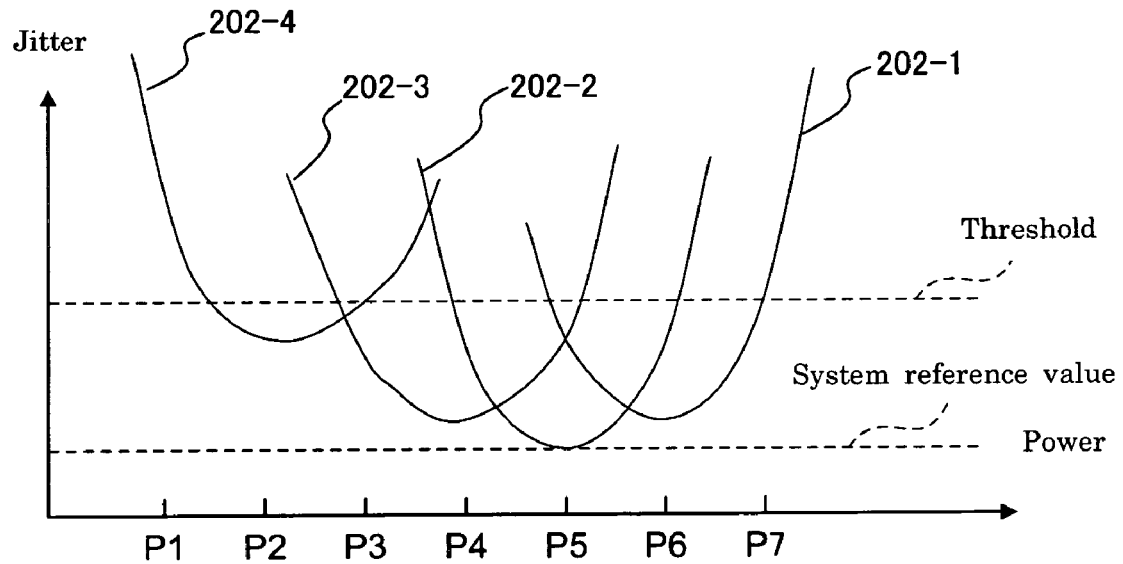
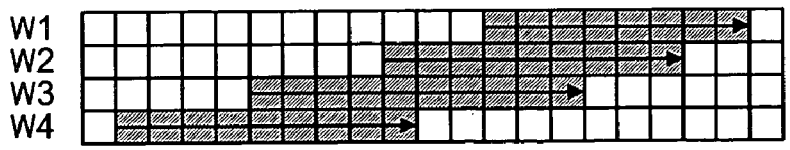

FIGURE 9
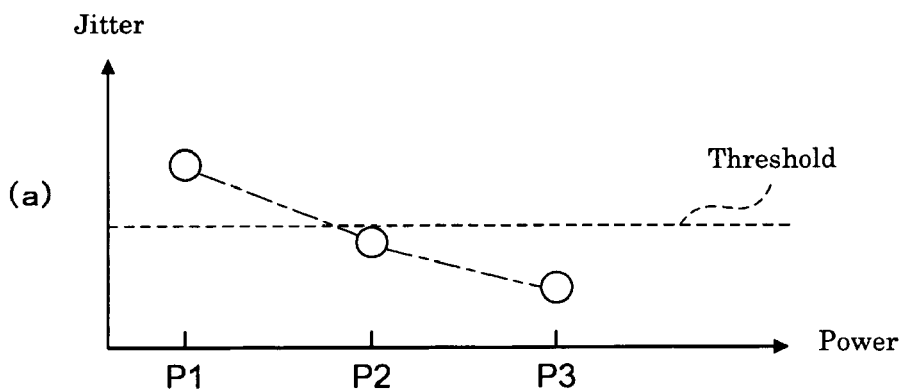
(a)
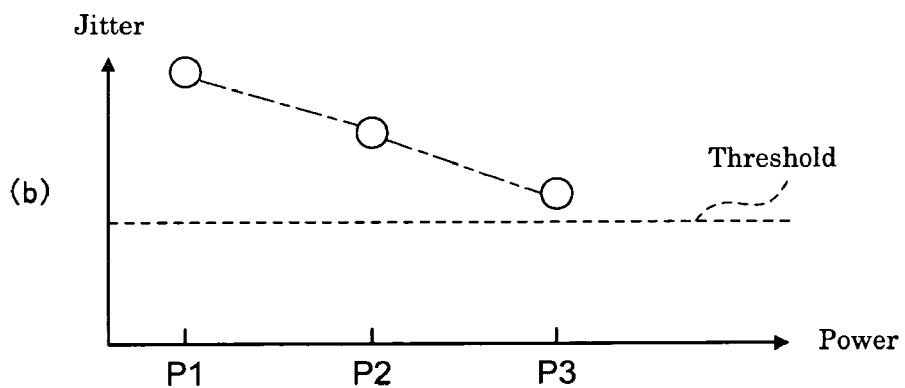
(b)
FIGURE 10
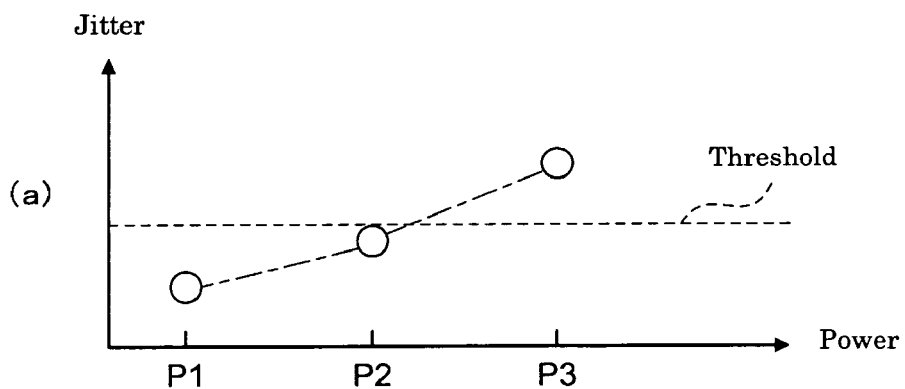
(a)
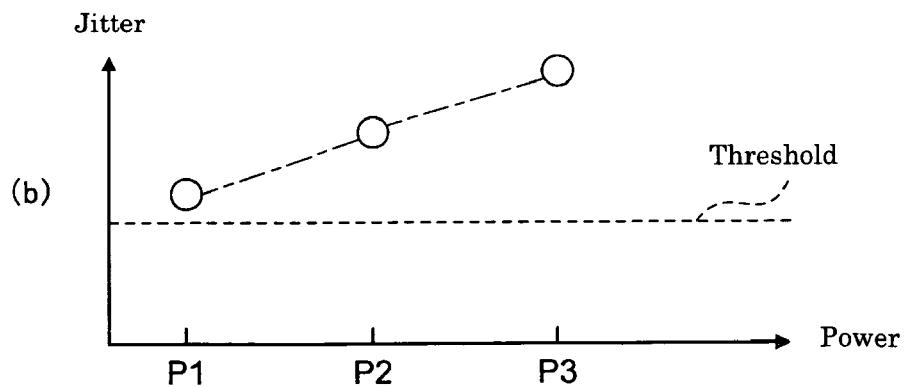
(b)

FIGURE 13

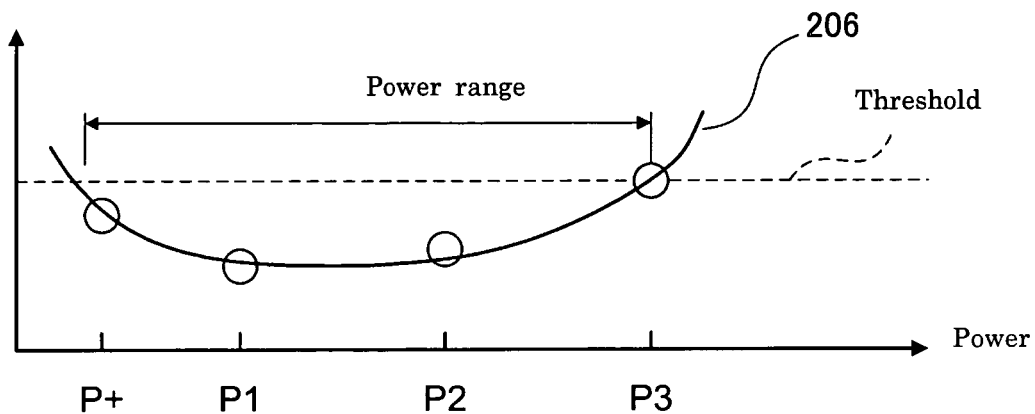

FIGURE 14

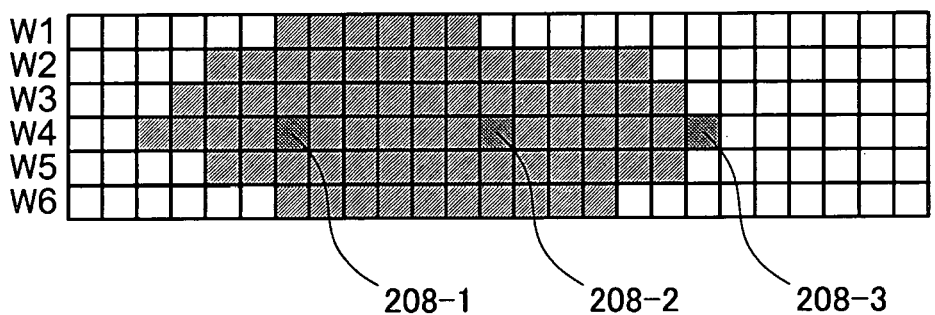

| Pattern | Shape | Relation with threshold | Prediction of recording characteristics | Pulse width |
|---|---|---|---|---|
| 1 | Given | Max. jitter ≤ threshold | Same sensitivity | ±0.2T |
| 2 | Downwardly convex | Min. jitter ≤ threshold | Same sensitivity | ±0.1T |
| 3 | Downwardly convex | Min. jitter > threshold | Same sensitivity and large difference in feature | ±0.2T |
| 4 | Downward-sloping | Min. jitter ≤ threshold | Slightly lower sensitivity | +0.1T, +0.2T |
| 5 | Downward-sloping | Min. jitter > threshold | Significantly lower sensitivity | +0.2T, +0.4T |
| 6 | Upward-sloping | Min. jitter ≤ threshold | Slightly lower sensitivity | −0.1T, −0.2T |
| 7 | Upward-sloping | Min. jitter > threshold | Significantly higher sensitivity | −0.2T, −0.4T |
| 8 | Upwardly convex | Max. jitter > threshold | NG | ±0.2T | m'T/(n-m) ratio determination flow

FIGURE 21
| No | Polarity | Count result |
|---|---|---|
| 1 | Pit | 5 |
| 2 | Land | 6 |
| 3 | Pit | 9 |
| 4 | Land | 8 |
| 5 | Pit | 13 |
| 6 | Land | 8 |
| . | . | . |
| . | . | . |
| . | . | . |
FIGURE 22
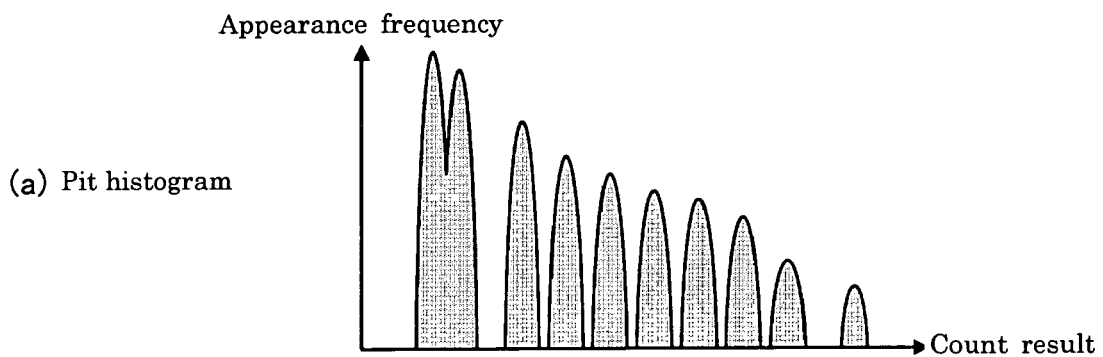
(a) Pit histogram
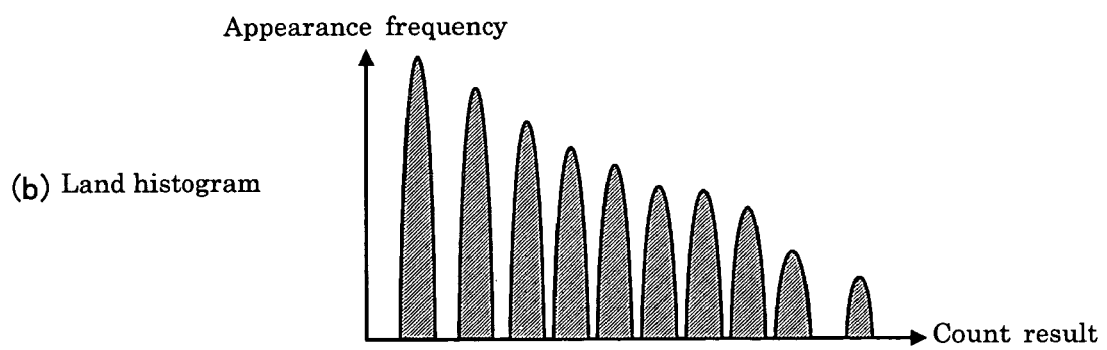
(b) Land histogram (a) Pit histogram (b) Land histogram (a) Pit length threshold

| DATA | Count |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

(b) Land length threshold

| DATA | Count |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

| Search pattern | LxT threshold | | PyT threshold | | LzT threshold | |
|---|---|---|---|---|---|---|
| | min | max | min | max | min | max |
| ≥L6 − P3 − ≥L6 | 26 | 100 | 2 | 9 | 26 | 100 |
| ≥L6 − P4 − ≥L6 | 26 | 100 | 9 | 18 | 26 | 100 |
| ≥L6 − P5 − ≥L6 | 26 | 100 | 18 | 26 | 26 | 100 |
| ≥L6 − P6 − ≥L6 | 26 | 100 | 26 | 35 | 26 | 100 |
| ... | ... | ... | ... | ... | ... | ... |

| No | Polarity | Count result |
|---|---|---|
| 1 | Pit | 5 |
| 2 | Land | 6 |
| 3 | Pit | 9 |
| ... | ... | ... |

| Control factor | Pit to be corrected | | | | | | | | | |
|---|---|---|---|---|---|---|---|---|---|---|
| | 3T | 4T | 5T | 6T | 7T | 8T | 9T | 10T | 11T | 14T |
| PWD | PW3 | PW4 | PW5 | PW6 | PW7 | PW8 | PW9 | PW10 | PW11 | PW14 |
| Tmp | Tm3 | Tm4 | Tm5 | Tm6 | Tm7 | Tm8 | Tm9 | Tm10 | Tm11 | Tm14 |

FIGURE 39

(a) Phase shift detection on front side of pit

FPS
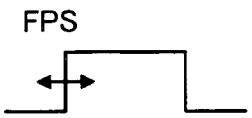

| Search pattern | PxT threshold | | LyT threshold | | PzT threshold | |
|---|---|---|---|---|---|---|
| | min | max | min | max | min | max |
| ≥P6 − L4 − P3 | 26 | 100 | 10 | 18 | 2 | 9 |
| ≥P6 − L4 − P4 | 26 | 100 | 10 | 18 | 9 | 18 |
| ≥P6 − L4 − P5 | 26 | 100 | 10 | 18 | 18 | 26 |
| ≥P6 − L4 − P6 | 26 | 100 | 10 | 18 | 26 | 35 |
| ... | ... | ... | ... | ... | ... | ... |

(b) Phase shift detection on rear side of pit

RPS
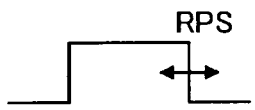

| Search pattern | PxT threshold | | LyT threshold | | PzT threshold | |
|---|---|---|---|---|---|---|
| | min | max | min | max | min | max |
| P3 − L4 − ≥P6 | 2 | 9 | 10 | 18 | 26 | 100 |
| P4 − L4 − ≥P6 | 9 | 18 | 10 | 18 | 26 | 100 |
| P5 − L4 − ≥P6 | 18 | 26 | 10 | 18 | 26 | 100 |
| P6 − L4 − ≥P6 | 26 | 35 | 10 | 18 | 26 | 100 |
| ... | ... | ... | ... | ... | ... | ... |

FIGURE 40

HID

| Search pattern | LxT threshold | | PyT threshold | | LzT threshold | |
|---|---|---|---|---|---|---|
| | min | max | min | max | min | max |
| L3 − P4 − ≥L6 | 2 | 9 | 10 | 18 | 26 | 100 |
| L4 − P4 − ≥L6 | 9 | 18 | 10 | 18 | 26 | 100 |
| L5 − P4 − ≥L6 | 18 | 26 | 10 | 18 | 26 | 100 |
| L6 − P4 − ≥L6 | 26 | 35 | 10 | 18 | 26 | 100 |
| ... | ... | ... | ... | ... | ... | ... |

(a) Ttop correction amount

| Land before pit | Pit to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

(b) Tlast correction amount

| Land after pit | Pit to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

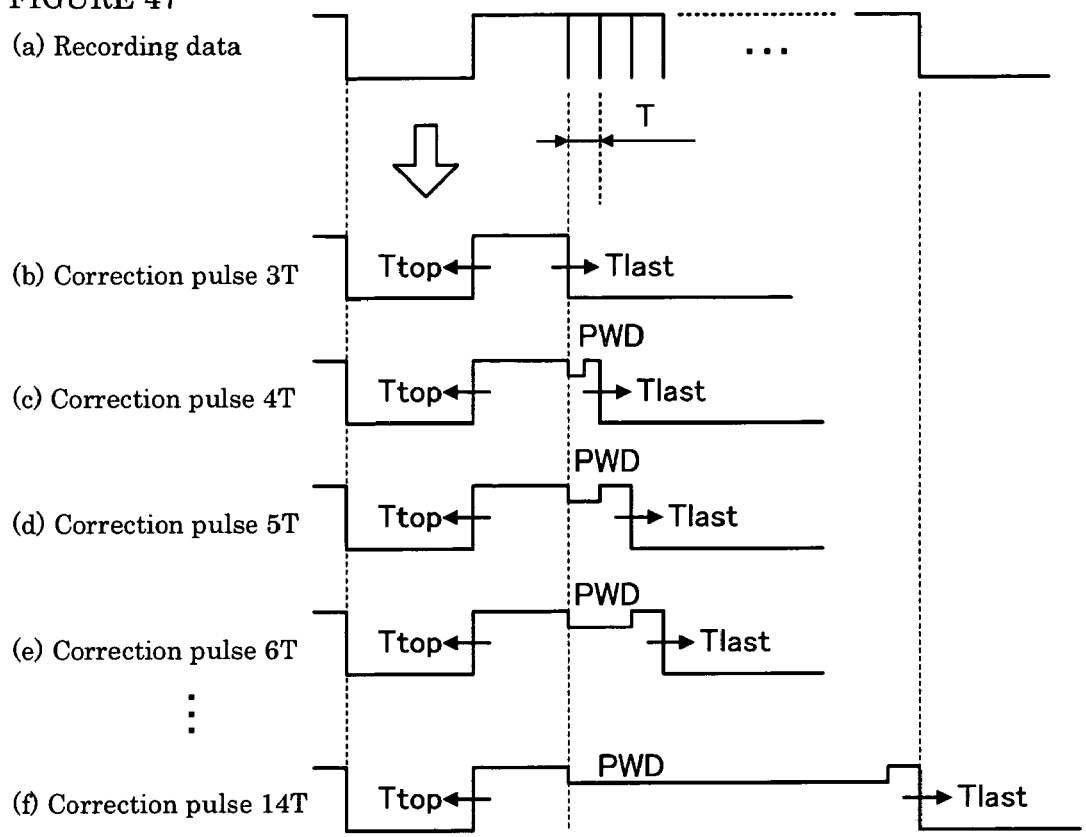
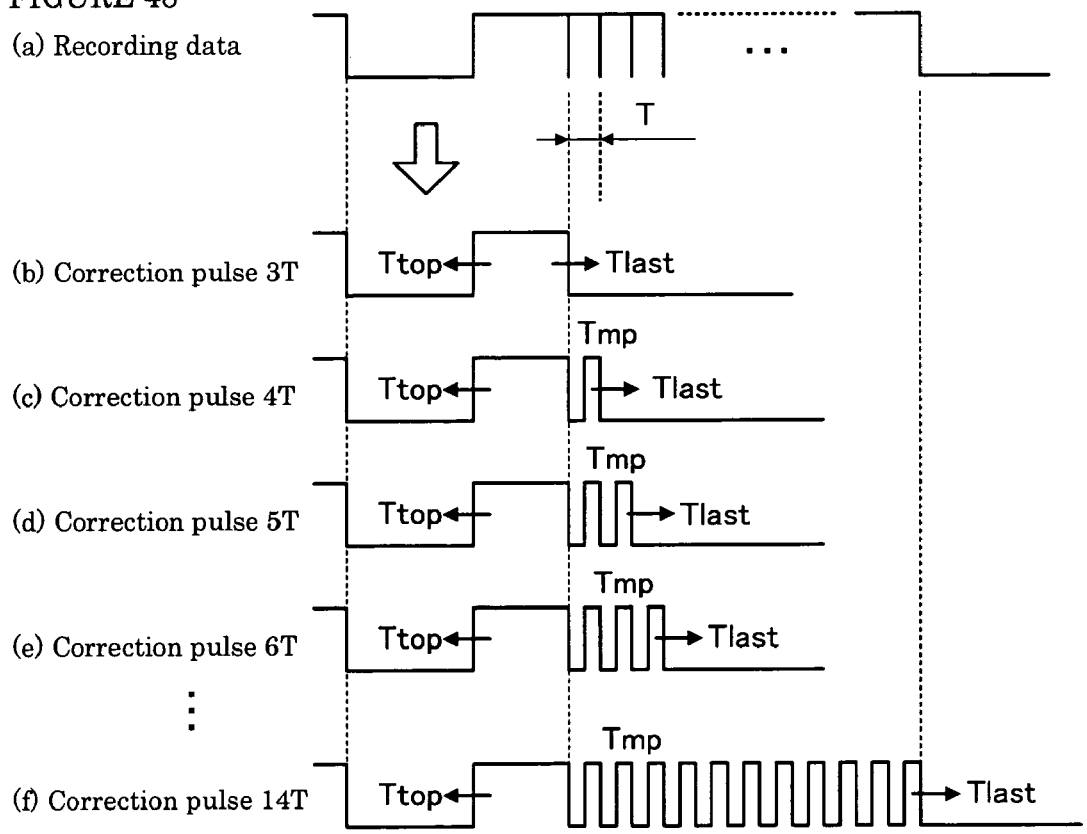

OPTICAL INFORMATION RECORDING APPARATUS AND METHOD AND PROCESSING CIRCUIT

FIELD

The present invention relates to an optical information recording apparatus, and more particularly to an optical information recording apparatus capable of optimizing a recording condition depending on the compatibility between a drive and a medium.

BACKGROUND

In a recording process onto an optical information recording medium (hereinafter referred to as a "medium") as represented by CD-R, DVD-R, or the like, the compatibility between a medium to be recorded onto and a recording apparatus (hereinafter referred to as a "drive") to be used for recording is dependent on the combination of them. As a cause for the dependence, both medium-side factors that affect an optimum recording condition due to difference in type of a recording material comprising a medium and/or manufacturing variation in deposited film properties and drive-side factors that also affect an optimum condition due to difference in type of an optical pickup device or a semiconductor laser comprising a drive and/or manufacturing variation in assemblies may be taken into account; however, the cause is actually due to a certain combination of these factors and therefore there exists an optimum recording condition for every combination of a medium and a drive.

A conventional method has thus been employed in such a way that a recording condition prepared for each type of medium is stored to a drive side in addition to storing to a medium side the ID information from which a type of the medium is identifiable to the drive side, and when actual recording is implemented, the ID information on the medium is read from the medium being loaded in the drive and a recording condition (hereinafter referred to as "write strategy") associated with the ID information is used.

However, sometimes the conventional method cannot accept an unknown medium, which has not been examined, under a prepared recording condition although it can select to some extent a recording condition appropriate for a known medium, which has been examined. Also, sometimes the conventional method cannot accept even a known medium under a prepared recording condition in case of change in recording environment such as a recording rate, disturbance, or change with time.

A method contemplated to accommodate such an unknown medium is described in the following literatures:
Patent Document 1: Japanese Unexamined Patent Publication No. 2003-30837, and
Patent Document 2: Japanese Unexamined Patent Publication No. 2004-110995.

As described in paragraph [0020] of the Patent Document 1 as: ". . . a phase error relative to a channel clock is detected for every recording pattern. A recording compensation parameter adjustment part 12 optimizes an emission waveform rule based on the detection result obtained in a phase error detection part 11. . . ", a method for detecting a phase error by comparing with a channel clock and correcting for the phase error is disclosed.

The paragraph [0024] of the document describes, "A test pattern is then recorded to determine the emission waveform rule. The relationship between a prepared emission waveform rule and a phase error amount is investigated by reproducing the region onto which the test pattern is recorded. In other words, a phase error amount for every combination of a length of one of various marks and a space length immediately before the mark is measured. A desired emission waveform rule is then determined by estimating the emission waveform rule under which the phase error becomes zero from the phase error amount measured. . . ", that is, a method is disclosed, wherein a phase error amount is measured for every combination of a mark and a corresponding space and then the emission waveform rule under which the phase error becomes zero is estimated (see FIGS. 8 and 12).

Because the method described in the Patent Document 1 involves a correction to be implemented based on a phase error of a recorded pattern, it is effective to optimize a strategy.

In paragraph [0045] of the Patent Document 2, ". . . a top pulse corresponding to a 3T period and a non-multi-pulse corresponding to an 8T period are integrally (successively) generated . . . "is described and furthermore ". . . a laser power for a write pulse is adjusted in two stages and when the ratio of a laser power (a pulse height value of the top pulse) Ph to a laser power (a pulse height value of the non-multi-pulse) Pm is optimum, an optimum power can be obtained . . . "is described in paragraph [0046], that is, it is suggested that an optimization of the ratio Ph/Pm is effective.

However, because the method described in the Patent Document 1 involves a fine adjustment of a strategy, which is preliminarily stored in a drive, meeting the good recording quality is difficult for the medium that is not adaptive to the preliminarily stored strategy Furthermore, in the method of the Patent Document 2, initial values for Ph and Pm are temporarily set based on values stored in a drive or a medium as described in paragraph [0067] thereof, followed by obtaining an optimum Ph/Pm ratio. Hence, meeting the good recording quality is difficult for the medium that is not adaptive to the temporarily set values, similarly to the case of the Patent Document 1.

SUMMARY OF THE INVENTION

It is therefore the object of the present invention to provide a method for optimizing a recording condition depending on the compatibility between a drive and a medium.

To accomplish the above purpose, a first aspect of the present invention is characterized by an optical information recording apparatus for recording information onto an optical recording medium by irradiating a laser beam with a recording pulse comprised of a top pulse and a following pulse, wherein a condition of the top pulse is determined by test recording onto the optical recording medium; and a condition of the following pulse is determined by test recording under the condition of the top pulse.

Preferably, the top pulse is configured to correspond to the shortest pulse that has the highest appearance frequency and the difficulty in recording, for example, in either case of a pit train comprising 3T to 11T for CD-R or a pit train comprising 3T to 11T and 14T for DVD-R, a top pulse preferably corresponds to the 3T pit.

Also, the following pulse may be configured to be a non-multi-pulse or a multi-pulse. In the case of a non-multi-pulse, a recording pulse is preferably optimized based on the power ratio of a top pulse to a following pulse while it is preferably optimized by adjusting a duty of each of a plurality of divided pulses comprising a following pulse in the case of a multi-pulse.

Conditions of the top and following pulses may be determined in any combination of a pulse power, a pulse width and a duty. Preferably, a recording pulse is optimized by adjusting a ratio of the top pulse to the following pulse.

In the present invention, determining a following pulse after the determination of a top pulse allows the realization of more stable recording quality. In other words, the influence of the front side of a recording pulse on recording quality is larger than that of its rear side and in particular the influence significantly arises when a 3T pulse that has the highest appearance frequency is set as a top pulse.

Accordingly, the present invention employs a method wherein the preliminary determination of a top pulse condition close to an optimum allows finding a top pulse condition closer to the optimum and subsequently a following pulse condition is determined while the method as described in the Patent Document 2, wherein the optimization of the ratio of a top pulse to a following pulse is preferentially implemented, leads to the reduction in accommodation capability for a medium unknown to a drive because sometimes an optimum solution for the top pulse is not obtained.

In addition, to improve accuracy, the determination of a top pulse condition followed by the determination of a following pulse condition may be repeated several times.

A second aspect of the present invention is characterized by an optical information recording apparatus for recording information onto an optical recording medium by irradiating a laser beam with a recording pulse comprised of a top pulse and a following pulse, wherein an inspection of recording quality is implemented by test recording onto the optical recording medium; a condition of the top pulse is determined while varying a recording condition based on a result of the inspection; and a condition of the following pulse is determined by test recording under the condition of the top pulse.

The inspection of recording quality is preferably implemented by a method for evaluating the compatibility between a drive and a medium by test recording onto the medium onto which information is to be actually recorded. Based on the recording quality obtained as a result of the inspection, a region where a probability of finding an optimum recording condition is high can be predicted. Accordingly, implementing test recording intensively in the region allows obtaining an optimum top pulse condition with a smaller number of test runs.

A third aspect of the present invention is characterized by an optical information recording apparatus for recording information onto an optical recording medium by irradiating a laser beam with a recording pulse comprised of a top pulse and a following pulse, the optical information recording apparatus comprising: means for determining a condition of the top pulse by test recording onto the optical recording medium; means for determining a condition of the following pulse by test recording under the condition of the top pulse; and means for determining a phase condition of the recording pulse by test recording under the conditions of the top pulse and the following pulse.

As described above, a probability of finding an optimum solution is increased with a smaller number of test runs by repeating test recording while using the recording conditions sequentially obtained. The present invention recommends that an order of priority for various determinations that influence the improvement of the probability is the determination of a top pulse condition, that of a following pulse condition and that of a phase condition of a recording pulse in descending order.

The phase condition of a recording pulse is preferably defined as positions on the front side and the rear side of the recording pulse, and more preferably defined in consideration of the anteroposterior relationship of the recording pulse, including land lengths immediately before and after the recording pulse, a pit length before the recording pulse, and the like.

A fourth aspect of the present invention is characterized by an optical information recording apparatus for recording information onto an optical recording medium by irradiating a laser pulse based on a recording pulse train using a clock signal with a predetermined frequency as a reference, wherein the recording pulse train comprises an mT pulse having the shortest length of m'T in the recording pulse train and an nT pulse having a length of n'T defined by the following expression:

$$n'T = m'T + (n-m)T,$$

where T represents the clock period, m' the clock number of the shortest pulse, n'the clock number of the given pulse, mT the data length of the shortest pit, and nT the data length of a pit longer than the shortest pit; a recording condition of the nT pulse is determined by test recording onto the optical information medium while implementing the steps of (1) the determination of a condition of the mT pulse,
(2) the determination of an m'T/(n−m)T ratio, and
(3) the determination of a condition of the nT pulse; and
the recording of information is implemented by the use of the mT pulse and the nT pulse determined through the steps.

The nT pulse varies according to a pit or a land having a length of 3T to 11T in the case of CD-R and of 3T to 11T or 14T in the case of DVD-R. In either case, mT=3T because 3T is the shortest length. Optical disc systems generally have the following relationships: m and n are integers, and m≦n. In addition, the above-described clock signal can be generated by a well-known method using a wobble signal or a pre-pit signal included in a reproduced signal Preferably, the nT pulse successively comprises a top pulse comprised of the mT pulse and a following pulse comprised of a (n−m)T pulse following the top pulse. The mT pulse is most difficult to be recorded with because it is the shortest pulse, and therefore the determination of an mT pulse condition should be implemented before the determination of any other pulse conditions.

The length of the mT pulse is defined as m'T, which is shifted relative to the data length mT of the shortest pit. This is because an optimum recording pulse length is determined in consideration of a shift amount relative to an ideal length in the case of recording the shortest pit, and the length of the nT pulse also becomes n'T due to the influence of the m'T.

For example, when recording the shortest 3T datum with a recording pulse having a length of 2T, because mT=3T and m'T=2T, a recording pulse n'T n'T for recording a 5T datum becomes 2T+(5−3)T=4T.

The m'T/(n−m)T ratio is defined as a conditional ratio of the mT pulse to the (n−m)T pulse. For example, preferably, the m'T/(n−m)T ratio is defined as a ratio of the pulse height of the mT pulse to that of the (n−m)T pulse in the case of a non-multi-pulse while it is defined as a ratio of the pulse width of the mT pulse to that of the (n−m)T pulse or as a duty ratio of divided pulses comprising the (n−m) T pulse in the case of a multi-pulse. More preferably, the m'T/(n−m)T ratio is determined by test recordings under various (n−m)T pulse conditions with a fixed mT pulse condition.

In other words, the m'T/(n−m)T ratio is preferably determined based on an energy ratio of these two pulses, i.e., a ratio of an energy arising from the m'T pulse to that arising from the (n−m)T pulse, and the energy ratio can be set by the use of powers or pulse widths. More preferably, the m'T/(n−m)T ratio is defined as a pulse length ratio in the case of a recording pulse comprised of a multi-pulse while it is defined as a power ratio in the case of a recording pulse comprised of a non-multi-pulse.

An nT pulse condition is preferably determined in combination of the mT pulse condition meeting the above ratio and the (n–m)T pulse condition, and more preferably it is determined in consideration of a phase condition defining the front side and rear side positions of a recording pulse.

A fifth aspect of the present invention is characterized by an optical information recording apparatus for recording information onto an optical recording medium by irradiating a laser pulse based on a recording pulse train using a unit time length as a reference, wherein the recording pulse train comprises an mT pulse for forming the shortest pit to be recorded onto the optical information medium and an nT pulse having a length of n'T defined by the following expression:

$$n'T = m'T + (n-m)T,$$

where m'T represents the length of a recording pulse for forming the shortest pit, n'T the length of a recording pulse for forming a pit longer than the shortest pit, mT the data length of the shortest pit, and nT the data length of a pit longer than the shortest pit;

a recording condition of the nT pulse is determined by test recording onto the optical information medium while implementing the steps of:
(1) the determination of a condition of the mT pulse,
(2) the determination of an m'T/(n–m)T ratio, and
(3) the determination of a condition of the nT pulse; and the recording of information is implemented by the use of the mT pulse and the nT pulse determined through the steps.

As has been described, the present invention allows obtaining a recording condition closer to an optimum even for a medium unknown to a drive.

BRIEF DESCRIPTION OF DRAWINGS

FIG. 1 is a conceptual diagram illustrating the configuration of a recording pulse and an overall flow for determining a recording condition according to the present invention.

FIG. 2 is a block diagram illustrating the internal configuration of a drive according to the present invention.

FIG. 5 is a conceptual diagram illustrating one example of the flow shown in FIG. 4.

FIG. 6 is a conceptual diagram illustrating another example of the flow shown in FIG. 4.

FIG. 9 is a conceptual diagram illustrating an example of downward-sloping characteristics obtained as a result of the inspection of recording quality implemented at the step S120 in FIG. 3.

FIG. 10 is a conceptual diagram illustrating an example of upward-sloping characteristics obtained as a result of the inspection of recording quality implemented at the step S120 in FIG. 3.

FIG. 13 is a conceptual diagram illustrating one example of the determination of a test region to be implemented at the step S122 in the case of the upward-sloping characteristics obtained at the step S120 in FIG. 3.

FIG. 14 is a diagram illustrating an example of the case where the step 120 in FIG. 3 is implemented by the use of eight patterns.

FIG. 21 is a conceptual diagram illustrating the storage of count results shown in FIG. 19.

FIG. 22 is a conceptual diagram illustrating the preparation of a histogram shown in FIG. 19.

FIG. 39 is a conceptual diagram illustrating a table configuration for searching specific patterns to be used for the detection of a phase shift on the front side of a pit as well as for the detection of a phase shift on the rear side of a pit.

FIG. 40 is a conceptual diagram illustrating a table configuration for searching specific patterns to be used for detecting a phase shift of a pit due to thermal interference.

FIG. 47 is a conceptual diagram illustrating single pulses after corrections.

FIG. 48 is a conceptual diagram illustrating multi-pulses after corrections.

DETAILED DESCRIPTION

Figure 3:
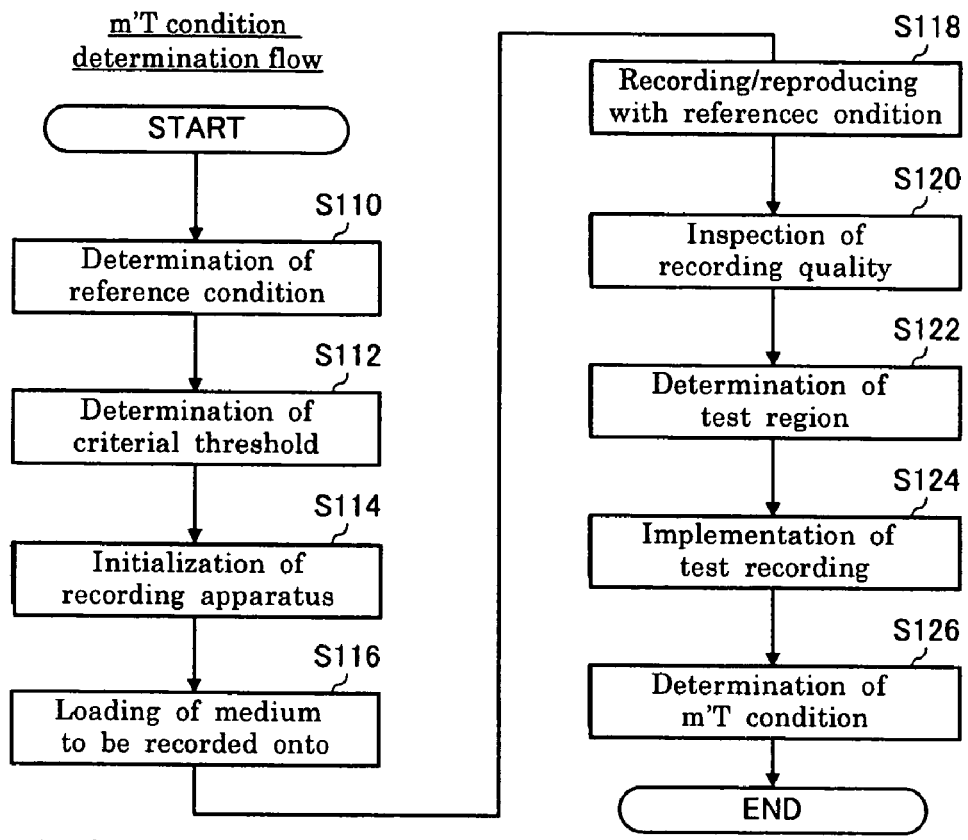
FIG. 3 is a flow chart illustrating a detailed execution procedure of an m'T determination flow shown in FIG. 1.

An optical information recording apparatus according to the present invention will hereinafter be described in detail in reference to the accompanying drawings. The present invention may be modified from time to time, and shall not be limited to the embodiments disclosed herein.

FIG. 1 is a conceptual diagram illustrating the configuration of a recording pulse and an overall flow for determining a recording condition according to the present invention. As shown in the diagram (a), the recording pulse 10 of the present invention is comprised of a top pulse 12 located at the forefront of the recording pulse and a following pulse 14 following the top pulse.

Assuming that a data length of the shortest pit is mT, a recording pulse length for the shortest pit is m'T, a data length of a pit longer than the shortest pit is nT and a length of the recording pulse 10 for the pit is n'T, the top pulse 12 has a length of m'T, which is equal to the recording pulse length for the shortest pit, and the following pulse 14 has a length of (n−m)T, where m and n in this embodiment take the values of m=3 and n=3~11, or 14, respectively, and T is a unit time defined in a optical disc system, of which a frequency is determined by a clock signal.

A condition of the recording pulse 10 is determined by implementing the flow illustrated in the diagram (b). The flow is implemented with test recording under the condition that an optical information recording medium (hereinafter referred to as a "medium" 0 or a "disc") is loaded into an optical information recording apparatus (hereinafter referred to as a "recording apparatus" or a "drive").

As shown in the diagram (b), when determining a condition of the recording pulse 10, a pulse condition for the length of m'T is first determined (step S100) and then the ratio of the length m'T to the length (n−m)T, i.e., m'T/(n−m)T, is obtained by using the condition for the length m'T (step S200). Subsequently, an nT pulse is configured based on the ratio (step S300) and finally the condition of the recording pulse having the length of n'T is determined by correcting for a phase shift (step S400).

FIG. 2 is a block diagram illustrating the internal configuration of a drive according to the present invention. As shown in the diagram, the drive 100 records/reproduces information onto/from a medium 50 by use of a laser beam emitted from a laser oscillator 103.

When information is recorded onto the medium 50, a recording signal corresponding to desired recording information is encoded in EFM format with an encoder 101 and then the encoded recording data are transmitted to a strategy circuit 102.

The strategy circuit 102 involves various setting parameters already set for a predetermined strategy and generates a recording pulse that is expected to result in a desired recording state by controlling intensity and a pulse width of the laser beam emitted from the laser oscillator 103 based on the correction of the various setting parameters for the strategy.

The recording pulse generated with the strategy circuit 102 is transmitted to the laser oscillator 103, which controls an emitting laser beam in accordance with the recording pulse and irradiates the controlled laser beam onto the medium 50 rotating at a constant linear or rotational velocity through a lens 104, a half mirror 105 and a lens 106, whereby a recording pattern comprised of a pit/land train corresponding to the desired recording state is recorded onto the medium 50.

On the other hand, when information recorded on the medium 50 is reproduced, a homogeneous reproducing laser beam emitted from the laser oscillator 103 is irradiated onto the medium 50 rotating at a constant linear or rotational velocity through the lens 104, the half mirror 105 and the lens 106.

The reproducing laser beam, which has less intensity than the recording laser beam emitted from the laser oscillator 103 during recording, is reflected at the medium 50, and the reflected beam from the medium 50 is received by a photo-receiving part 108 through the lens 106, the half mirror 105 and a lens 107 and then transformed into an electrical signal.

The electrical signal output from the photo-receiving part 108 corresponds to a recorded pattern comprised of pits and lands recorded on the medium 50. The electrical signal output from the photo-receiving part 108 is also used for extracting a clock signal with a predetermined frequency from a wobble component included in the output electrical signal with a synchronizing signal detection circuit 109. The electrical signal is further binarized with a binarization circuit 110, then decoded with a decoder 111 and finally output as a reproduced signal.

Because recording quality in a recording system comprised of a drive and a medium is dependent on variations in characteristics of the drive and characteristics of the medium as described above, absorbing the influence of the dependence with the strategy allows the improvement of the recording quality. In addition, any of various optical information recording media including a dye-based medium represented by CD-R or DVD-R and a phase-change medium represented by CD-RW or DVD-RW can be applied to the present invention.

The determination flow for a recording pulse condition to be implemented with the drive described above, illustrated in FIG. 1 (b), will hereinafter be described in detail Determination of m'T Condition FIG. 3 is a flow chart illustrating a detailed execution procedure of a flow for the determination of an m'T condition shown in FIG. 1. As shown in the flow chart, the steps S110~S114 for initial setting for the drive, the steps S116~S122 for the determination of a test recording condition and the step S124 for test recording under the determined test recording condition are sequentially implemented with the drive 100. Subsequently, based on the result of the test recording, the step S126 for the determination of the m'T pulse condition is implemented. The respective steps will hereinafter be described in detail.

Determination of Reference Condition

At the step S110 shown in FIG. 3, one pulse width and three power values are first obtained as a reference condition by test recording with a given standard medium while varying a recording rate. Preferably, a value that minimizes a jitter and two other values before and after the value are employed for these three power values, based on a result of the test recording. Furthermore, for the two other values, values in the vicinity of a threshold to be used as a criterion that judges whether or not the jitter is acceptable are preferably employed. The reference condition obtained at this step is utilized for the inspection of recording quality to be implemented at a later step.

Determining of Criterial Threshold

As will hereinafter be described, because the present invention is contemplated to set a region below the jitter threshold as a range for the test recording condition (hereinafter referred to as a "test region"), the threshold to be criterial should be determined. A standard value depending on the types of a drive and/or a medium may be prepared for the threshold; however, the threshold representing an upper limit of a jitter allowable region varies depending on conditions of optical components and other elements comprising a pickup device shown in FIG. 2 as well as on a recording rate.

Accordingly, it is recommended to set a more accurate test region by obtaining the threshold for every combination of a drive and a medium to be actually used and then giving the threshold a more accurate criterion.

However, because setting the threshold for every combination of a drive and a medium results in the increase in the number of recording processes, the threshold appropriate to each drive may be stored in the storage region 115 during drive manufacturing, assuming that the variation in characteristics between respective drives is a major factor in the variation in threshold.

Figure 4:
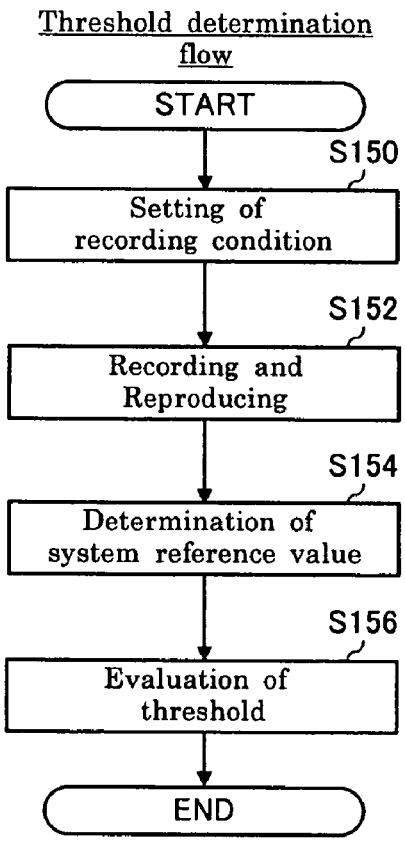
FIG. 4 is a flow chart illustrating the details of a determination step for a criterial threshold shown in FIG. 3.

FIG. 4 is a flow chart illustrating the detail of a determination step for the criterial threshold shown in FIG. 3. As shown in the flow, the determination of the criterial threshold is implemented in such a way that recording/reproducing is first implemented under predetermined conditions; a reference value for a system is then determined based on the result of the recording/reproducing; and a value wherein a predetermined margin is ensured for the reference value is applied to the threshold to be used for the determination of the test region. The respective steps will hereinafter be described.

First, the step S150 for setting recording conditions is implemented. At this step, patterns of conditions necessary for recording/reproducing, including a pulse width, a power, recording/reproducing rates, a recording address, and the like, are prepared. After the recording conditions are set to a drive, a reference medium is loaded into the drive. Preferably, as the reference medium, a medium with standard characteristics is selected from various media.

Then, by implementing the recording/reproducing step S152 for the loaded reference medium under the conditions set at the above step S150, recording/reproducing characteristics, such as jitters, are obtained under the respective conditions. The characteristics to be obtained at this step should be selected to be values representing recording quality.

Subsequently, the best value, such as a minimum jitter value, is selected from the recorded/reproduced characteristics obtained at the above step S152 and applied to a system reference value (step S154). Thus, a jitter value deemed to be close to an optimum value for the drive is set as a reference value. In addition, the reference value may be an intermediate value between two points at which a curve approximated for the jitters intersects with a predetermined threshold, i.e., an intermediate value of a power margin, instead of an optimum jitter value.

Finally, the step S156 is implemented for evaluating the threshold by multiplying the system reference value determined at the above step S154 by a predetermined factor $\alpha$ (preferably $\alpha > 1$). Thus, a judgment becomes possible by the use of the system reference value including a predetermined margin, that is, the threshold can be calculated with the system reference value as: threshold=(system reference value)×$\alpha$, where $\alpha$ preferably employs the value of approximately 1.5. In addition, for the factor $\alpha$, an appropriate value may be set depending on a type of a drive or a medium, for example, a value in the range of $\alpha = 0.8 \sim 1.2$ may be set so that the threshold becomes close to the system reference value, as well as a larger value in the range of $\alpha = 2.0 \sim 3.0$ may be set.

FIG. 5 is a conceptual diagram illustrating one example of the flow shown in FIG. 4. The example shown in the diagram illustrates reproduced characteristics 202-1~202-4 obtained while varying a power from P1 to P6 for each of pulse widths W1~W4, in the case of employing a jitter value as a characteristic value representing recording quality. In the example, the pulse widths W1~W4 and the powers P1~P6 represent recording conditions, and a jitter value corresponding to a minimum point of the reproduced characteristics 202-3 showing the lowest jitter value among the four reproducing characteristics is employed as a system reference value. A threshold is then evaluated by multiplying the system reference value by, e.g., 1.5. In addition, arrows illustrated in a power/pulse width matrix in the diagram represent directions of variation in the recording condition and are to be used in the same sense in the following description.

FIG. 6 is a conceptual diagram illustrating another example of the flow shown in FIG. 4. The example shown in the diagram illustrates reproduced characteristics 202-1~202-4 obtained while varying a power range for each of pulse widths W1~W4, in the case of employing a jitter value as a characteristic value representing recording quality. In the example, a jitter value corresponding to a minimum point of the reproduced characteristics 202-2 showing the lowest jitter value among the four reproduced characteristics is employed as a system reference value and a threshold is then evaluated by multiplying the system reference value by, e.g., 1.5. Thus, the determination of a threshold may be made while varying a power condition for each pulse width.

Figure 7:
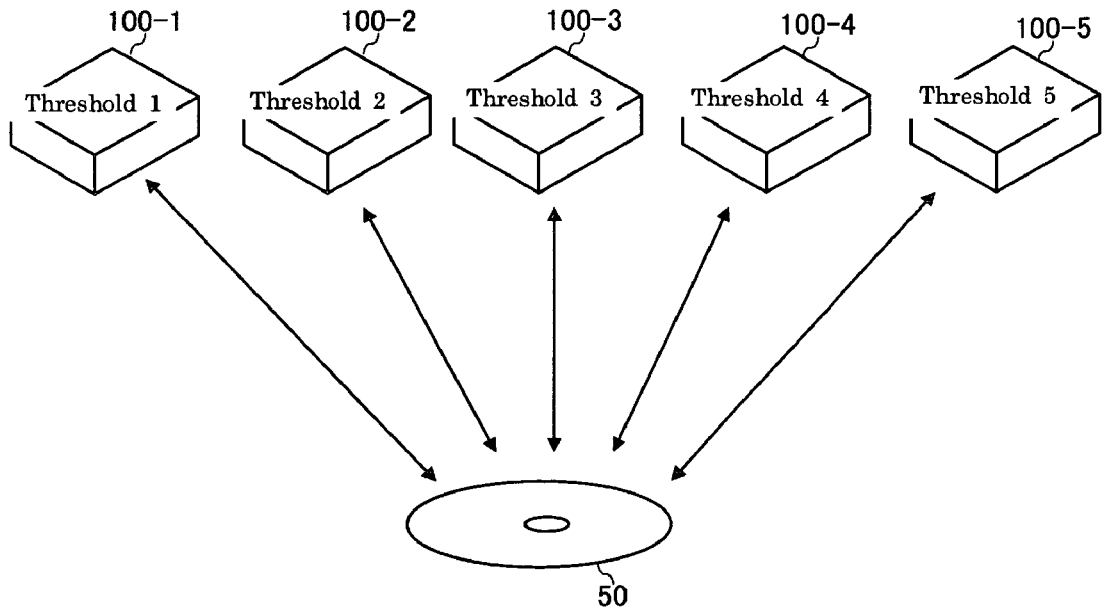
FIG. 7 is a conceptual diagram illustrating an example of the case where a threshold is evaluated for each drive.

FIG. 7 is a conceptual diagram illustrating an example of the case where a threshold is evaluated for each drive. In the case that the threshold is set preferably depending on the variation in characteristics between respective drives, information recorded on a common reference medium 50 is recorded/reproduced with each of drives 100-1~100-5 and then a threshold 1~5 specific to each of the drives is respectively stored as shown in the diagram.

In addition, in the case of simplifying a setting process for a threshold, a mean value is evaluated from the thresholds 1~5, which are obtained by recording/reproducing information recorded on a common reference medium with some standard drives, and then the mean threshold may be employed as a threshold for other drives.

The standard drives employed for evaluating the mean threshold may be identically designed ones or similarly designed ones instead of identically designed ones. The mean threshold may also be employed as a threshold for the standard drives. Furthermore, the mean threshold once evaluated may generally be employed as a threshold for identically designed or similarly designed drives to be manufactured afterward. Also, the mean threshold may be determined by evaluating a mean value for a plurality of drives that have the variation in characteristics between and are intentionally prepared.

Initialization of Recording Apparatus

The step S114 is implemented for storing the reference condition and the criterial threshold, which are described above and determined at the steps S110 and S112 in FIG. 3 respectively, into the storage region 115 of the drive 100. The step S114 is preferably implemented during manufacturing of the drive 100.

Loading Medium to be Recorded Onto

Subsequently, the step S116 is implemented for loading the medium 50 onto which information is to be recorded into the drive 100 already initialized at the step S114.

Recording/Reproducing Under Reference Condition

Under the condition set at the step S114, the step S118 for recording onto the medium 50 loaded at the step S116 is implemented. Specifically three jitter values are obtained by recording/reproducing three times using one pulse width and three power values defined as a reference condition. Plotting these three jitter values against the power yields a clear tendency of recorded characteristics depending on a combination of the drive 100 and the medium 50.

Inspection of Recording Quality

Figure 8:
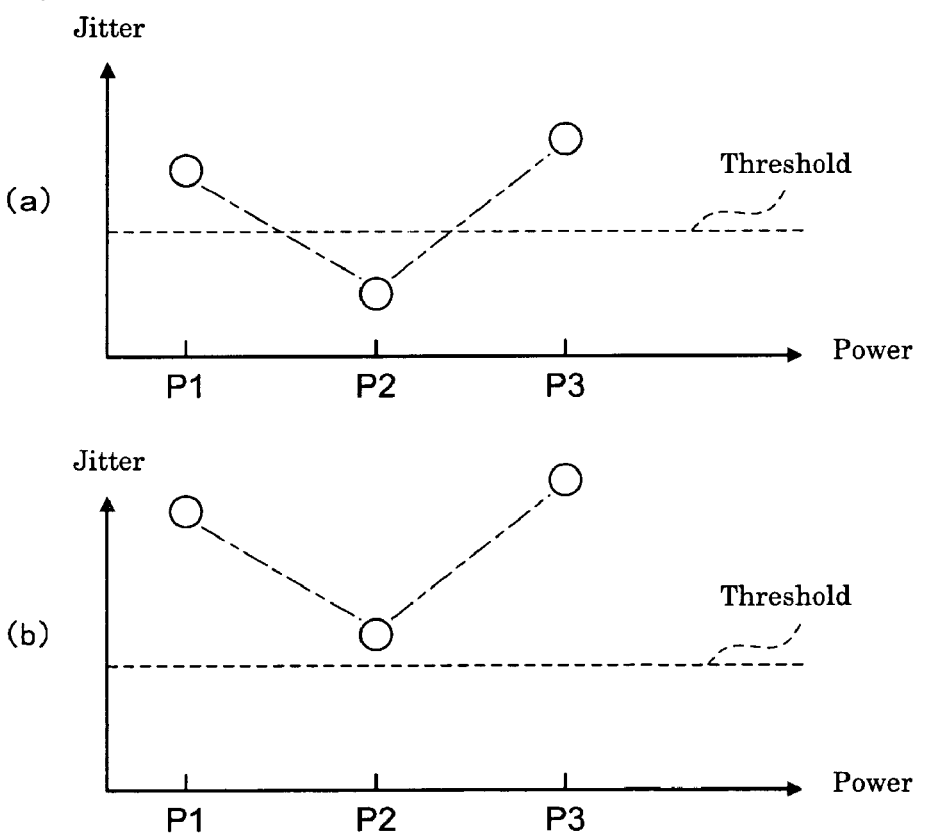
FIG. 8 is a conceptual diagram illustrating an example of downwardly convex characteristics obtained as a result of the inspection of recording quality implemented at the step S120 in FIG. 3.

FIG. 8 is a conceptual diagram illustrating an example of downwardly convex characteristics obtained as a result of the inspection of recording quality implemented at the step S120 in FIG. 3. As shown in the diagram, the recording quality is inspected using a threshold and a jitter value obtained at the preceding steps for each reference condition. The example illustrated in the diagram corresponds to a case where three power values P1, P2 and P3 are used as the reference condition and shows that a virtual line connecting these three jitter values at P1~P3 exhibits downwardly convex characteristics. Such downwardly convex characteristics mean that the reference medium used at the step S110 has the same sensitivity as the medium to be recorded onto loaded at the step S116 and recorded characteristics are similar to each other.

FIG. 8 (*a*) shows a case where the minimum value of the downwardly convex characteristics is below a threshold and (*b*) a case where the minimum value of the downwardly convex characteristics is above a threshold. In either case, the reference medium and the medium to be recorded onto are considered to have the same sensitivity as each other. When the reference medium and the medium to be recorded onto have the same sensitivity as each other as just described, a condition to be used for test recording is set as a plane region that is defined by (power)×(pulse width) centering on a reference condition as will be described below.

In the diagram, the difference between a reproduced value obtained at each of the recording powers P1, P2 and P3 and a reference reproduced value, i.e., in the case of the diagram, the difference between each of the jitter values and the jitter threshold shown in the diagram (a) is different from that shown in the diagram (b), and the reproduced value in the diagram (a) is closer to the reference reproduced value than that in the diagram (b).

This means that the detection of an optimum condition is easier in the case of the diagram (a), compared with the case of the diagram (b). Accordingly, when recording characteristics as shown in the diagram (a) are obtained, the number of test recording may be set smaller and more appropriate solution may be found with a smaller number of test runs, compared with the case of the diagram (b).

In other words, in case that the difference between the reproduced value and the reference reproduced value is small, an optimum condition is close to the above-described reference condition, while the optimum condition is far from the reference condition in case that the difference is large. Consequently, when the reduction of the number of test recording is desired, varying the number depending on the difference is preferable.

FIG. 9 is a conceptual diagram illustrating an example of downward-sloping characteristics obtained as a result of the inspection of recording quality implemented at the step S120 in FIG. 3. In the example shown in the diagram, the jitter value decreases with increasing the power from P1 to P3, that is, the example shows the downward-sloping characteristics. Such downward-sloping characteristics mean that the medium to be recorded onto has lower sensitivity than the reference medium.

FIG. 9 (*a*) shows a case where the minimum value of the downward-sloping characteristics is below a threshold and (*b*) a case where the minimum value of the downward-sloping characteristics is above a threshold. In either case, the medium to be recorded onto is considered to have lower sensitivity than the reference medium. When the medium to be recorded onto has the lower sensitivity than the reference medium as just described, test recording is implemented by shifting the test region, which is originally defined by (power)×(pulse width) centering on a reference condition, to both higher power and wider pulse width sides.

Also, because the minimum jitter value is considered to exist on the higher power side in the case of the downward-sloping characteristics as shown in FIG. 9, recording characteristics may again be checked by additional recording at a higher power than P3. In this case, the number of recording increases by one; however, inspection accuracy can be improved. In addition, also in the case of the downward-sloping characteristics, the number of test recording may be varied depending on the difference between a reproduced value and a reference reproduced value, just like the case of the above-described downwardly convex characteristics.

Further in the case of the downward-sloping characteristics, the optimum solution is considered to be further from the reference condition compared with the case of the downwardly convex characteristics described above in reference to FIG. 8. Accordingly, it is preferable to increase the number of test recording, compared with the case of the downwardly convex characteristics.

FIG. 10 is a conceptual diagram illustrating an example of upward-sloping characteristics obtained as a result of the inspection of recording quality implemented at the step S120 in FIG. 3. In the example shown in the diagram, the jitter value increases with increasing the power from P1 to P3, that is, the example shows the upward-sloping characteristics. Such upward-sloping characteristics mean that the medium to be recorded onto has higher sensitivity than the reference medium.

FIG. 10 (a) shows a case where the minimum value of the upward-sloping characteristics is below a threshold and (b) a case where the minimum value of the upward-sloping characteristics is above a threshold. In either case, the medium to be recorded onto is considered to have higher sensitivity than the reference medium. When the medium to be recorded onto has the higher sensitivity than the reference medium as just described, test recording is implemented by shifting the test region, which is originally defined by (power)×(pulse width) centering on a reference condition, to both lower power and narrower pulse width sides.

Also, because the minimum jitter value is considered to exist on the lower power side in the case of the upward-sloping characteristics as shown in FIG. 9, recording characteristics may again be checked by additional recording at a lower power than P1. In this case, the number of recording increases by one; however, inspection accuracy can be improved. In addition, also in the case of the upward-sloping characteristics, the number of test recording may be varied depending on the difference between a reproduced value and a reference reproduced value, just like the case of the above-described downwardly convex characteristics.

Further in the case of the upward-sloping characteristics, the optimum solution is considered to be further from the reference condition compared with the case of the downwardly convex characteristics described above in reference to FIG. 8. Accordingly, it is preferable to increase the number of test recording, compared with the case of the downwardly convex characteristics.

Determination of Test Region

Figure 11:
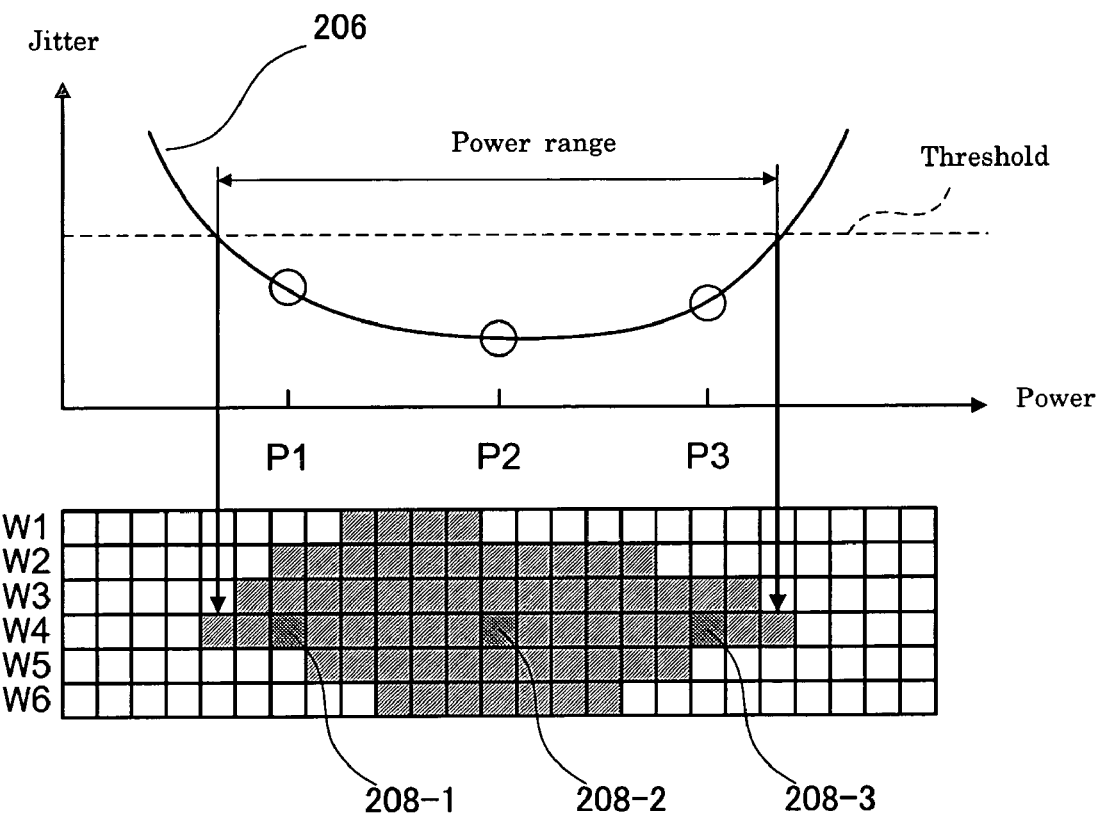
FIG. 11 is a conceptual diagram illustrating one example of the determination of a test region to be implemented at the step S122 in the case of the downwardly convex characteristics obtained at the step S120 in FIG. 3.

FIG. 11 is a conceptual diagram illustrating one example of the determination of a test region to be implemented at the step S122 in the case of the downwardly convex characteristics obtained at the step S120 in FIG. 3. As shown in the diagram, in the case of the downwardly convex characteristics, the region between two intersecting points of an approximated curve 206 for jitter values at the power values of P1, P2 and P3 with a threshold is applied to a power variation region to be used for test recording. In the present invention, the power variation region to be actually used for test recording is defined as a "power range" and a power region wherein a jitter is equal to the threshold or less is defined as a "power margin".

The approximated curve 206 varies depending on a pulse width. Accordingly, in case that the pulse width used as a reference condition is W4, recording is implemented at the power values of P1, P2 and P3 for each of the pulse widths W1~W6 centering on W4. Consequently, the approximated curve 206 can be obtained for each of the pulse widths W1~W6 and the intersecting points of the approximated curve 206 with the threshold can be checked for each pulse width. This allows obtaining a power range for each pulse width wherein a jitter is equal to the threshold or less and the hatched region in a power/pulse width matrix shown in FIG. 11 is applied to a test region. In the matrix, the three power values P1, P2 and P3 with respect to the pulse width W4 used as a reference condition are indicated as 208-1, 208-2 and 208-3, respectively. Accordingly, it can be considered that the test region determined above is set as a plane region that is defined by (power)×(pulse width) centering on the reference condition.

Thus, because obtaining a power range for each pulse width can lead to intensive test runs in the region wherein a jitter is equal to a threshold or less, more appropriate condition may be found with a smaller number of test runs.

In addition, the number of test runs can be reduced also by setting a larger step amount for a power variation in the case of a large power margin or by setting a smaller step amount for a power variation in the case of a small power margin. For example, in the case of a 10 mW margin, test recording may be implemented five times with a step amount of 2 mW assuming that an optimum value can be obtained even with rough tests, while in the case of an 1 mW margin, it may be implemented ten times with a step amount of 0.1 mW judging from the necessity of precise tests.

Figure 12:
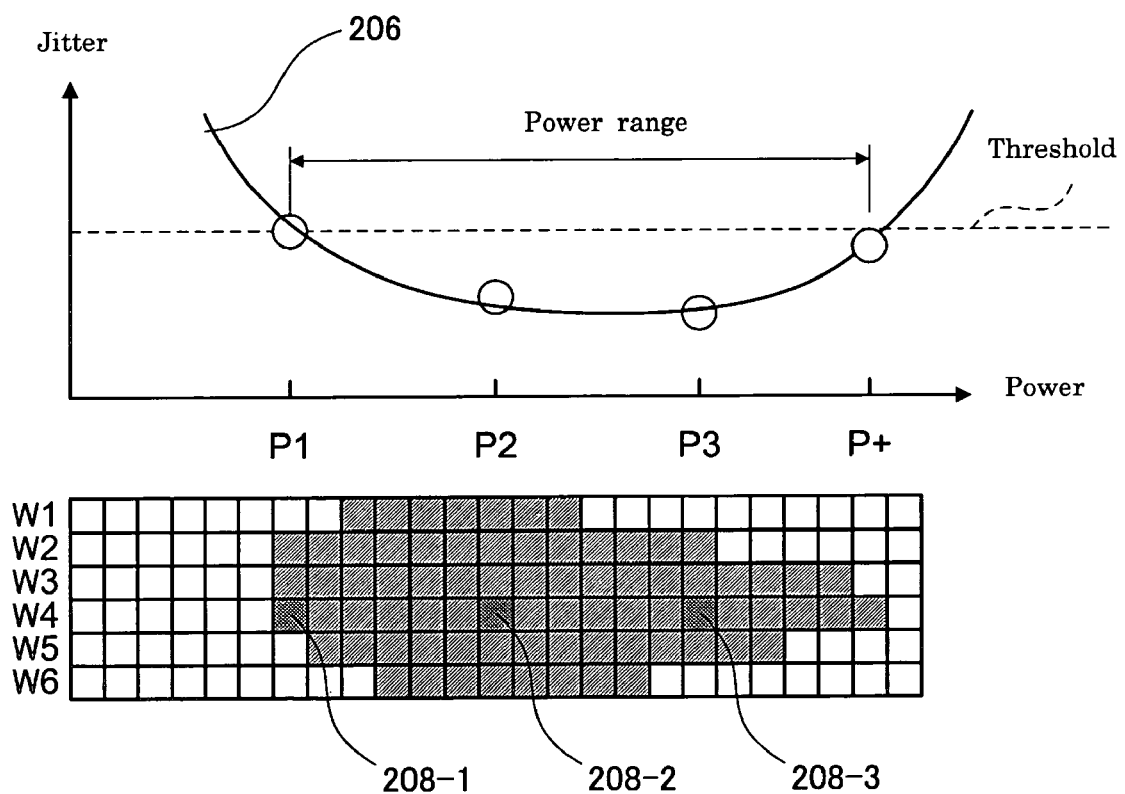
FIG. 12 is a conceptual diagram illustrating one example of the determination of a test region to be implemented at the step S122 in the case of the downward-sloping characteristics obtained at the step S120 in FIG. 3.

FIG. 12 is a conceptual diagram illustrating one example of the determination of a test region to be implemented at the step S122 in the case of the downward-sloping characteristics obtained at the step S120 in FIG. 3. Because an optimum condition is considered to exist on a higher power side in the case of the downward-sloping characteristics, additional recording is implemented at the power value of P+ higher than P3 and the region between two intersecting points of an approximated curve 206 for jitter values at the power values of P1, P2, P3 and P+ with a threshold is applied to a power range as shown in FIG. 12. This process is implemented for each of the pulse widths W1~W6, whereby a test region can be obtained as illustrated in a power/pulse width matrix in FIG. 12.

The test region determined above is just like a shape wherein a plane region that is defined by (power)×(pulse width) centering on the reference condition including 208-1, 208-2 and 208-3 is shifted to a higher power side. In the case of the downward-sloping characteristics, a power range may be determined by shifting the pulse width region W1~W6 to a wider pulse width region due to low sensitivity of a medium to be recorded onto although the example uses the pulse width region W1~W6, which is used above for the case of the downwardly convex characteristics.

FIG. 13 is a conceptual diagram illustrating one example of the determination of a test region to be implemented at the step S122 in the case of the upward-sloping characteristics obtained at the step S120 in FIG. 3. Because an optimum condition is considered to exist on a lower power side in the case of the upward-sloping characteristics, additional recording is implemented at the power value of P+ lower than P1 and the region between two intersecting points of an approximated curve 206 for jitter values at the power values of P+, P1, P2 and P3 with a threshold is applied to a power range as shown in FIG. 13. This process is implemented for each of the pulse widths W1~W6, whereby a test region can be obtained as illustrated in a power/pulse width matrix in FIG. 13.

The test region determined above is just like a shape wherein a plane region that is defined by (power)×(pulse width) centering on the reference condition including 208-1, 208-2 and 208-3 is shifted to a lower power side. In the case of the upward-sloping characteristics, a power range may be determined by shifting the pulse width region W1~W6 to a narrower pulse width region due to high sensitivity of a medium to be recorded onto although the example also uses the pulse width region W1~W6, which is used above for the case of the downwardly convex characteristics.

In the method described above, because recording quality is inspected for each pulse width and the number of test runs is determined for the each pulse width based on the inspection result, the reduction in the number of test runs can be expected. The inspection of recording quality described above is an example of the case where the inspection is implemented by patterning a jitter variation depending on respective recordings under the reference conditions; however, more preferably, it is recommended to implement the inspection by the use of eight patterns described below.

FIG. 14 is a diagram illustrating an example of a case where the step 120 in FIG. 3 is implemented by the use of eight patterns. As shown in the diagram, the pattern 1 can be applied to any patterns including downwardly convex, upward-sloping and downward-sloping patterns in case that the maximum jitter value is equal to a threshold or less. In the case of the pattern 1, a power condition is extended to both lower and higher power sides based on the idea that a larger margin wherein a jitter is equal to a threshold or less can be ensured in addition to the idea that a medium to be recorded onto has comparable sensitivity with a reference medium. In other words, in the case of the pattern 1, because a value in the vicinity of the threshold is not obtained, additional recording is implemented on both lower and higher power sides.

Subsequently, a curve approximation is implemented for jitter characteristics obtained from the additional recording and the region between two intersecting points of the approximated curve with the jitter threshold is applied to a reference power range.

Further in the case of the pattern 1, a pulse width region between a reference value ±0.2T is determined as a test region and an optimum recording condition is detected while varying a pulse width by 0.2T at a time in the test region during test recording, where T represents a unit time length of a recording pit.

If a pulse width to be the reference value is denoted by a pulse condition 1 and the two extended pulse widths by pulse conditions 2 and 3, the pulse conditions 2 and 3 in the case of the pattern 1 correspond to the pulse widths after the ±0.2T extension respectively. With the alteration of the pulse width condition, a power range to be used as a test condition is also slightly altered.

For example, when a pulse width is varied by 0.1T, (a reference power range)×(1−0.05×1) mW is applied to a power range for the varied pulse width. Similarly, when a pulse width is varied by 0.2T, (a reference power range)×(1−0.05×2) mW is applied to a power range for the varied pulse width, and when a pulse width is varied by −0.1T, (a reference power range)×(1−0.05×(−1)) mW is applied to a power range for the varied pulse width.

Accordingly, in the case of the pattern 1, a test condition involves the following three sets:
(1) A reference pulse width and a reference power range.
(2) (A reference pulse width)−0.2T, and (a reference power range)×(1−0.05×(−2)) mW
(3) (A reference pulse width)+0.2T, and (a reference power range)×(1−0.05×(+2)) mW.

In addition, the reference condition shown in the above (1) is not necessarily used for actual test recording.

The pattern 2 corresponds to the case of downwardly convex characteristics and can be applied when the minimum jitter value is equal to a threshold or less. In the case of the pattern 2, ((a reference pulse width)±0.1T) is selected as a pulse width condition, judging from the idea that a medium to be recorded onto has the same sensitivity as a reference medium. Subsequently, by a similar method to the case of the pattern 1, a power range is set for each of the pulse widths. Consequently, a test condition in the case of the pattern 2 involves the following three sets:
(1) A reference pulse width and a reference power range.
(2) (A reference pulse width)−0.1T, and (a reference power range)×(1−0.05×(−1)) mW.
(3) (A reference pulse width)+0.1T, and (a reference power range)×(1−0.05×(+1)) mW.

The pattern 3 corresponds to the case of downwardly convex characteristics and can be applied when the minimum jitter value is more than a threshold. In the case of the pattern 3, ((a reference pulse width)±0.2T) is selected as a pulse width condition, judging from the idea that a medium to be recorded onto has the same sensitivity as a reference medium and the difference in feature between them is large. Subsequently, by a similar method to the case of the pattern 1, a power range is set for each of the pulse widths. Consequently, a test condition in the case of the pattern 3 involves the following three sets:
(1) A reference pulse width and a reference power range.
(2) (A reference pulse width)−0.2T, and (a reference power range)×(1−0.05×(−2)) mW.
(3) (A reference pulse width)+0.2T, and (a reference power range)×(1−0.05×(+2)) mW.

The pattern 4 corresponds to the case of downward-sloping characteristics and can be applied when the minimum jitter value is equal to a threshold or less. In the case of the pattern 4, three points including a reference pulse width, ((a reference pulse width)+0.1T) and ((a reference pulse width)+0.2T) are selected as a pulse width condition, judging from the idea that a medium to be recorded onto has slightly lower sensitivity than a reference medium. Subsequently, by a similar method to the case of the pattern 1, a power range is set for each of the pulse widths. Consequently, a test condition in the case of the pattern 4 involves the following three sets:
(1) A reference pulse width and a reference power range.
(2) (A reference pulse width)+0.1T, and (a reference power range)×(1−0.05×(+1)) mW.
(3) (A reference pulse width)+0.2T, and (a reference power range)×(1−0.05×(+2)) mW The pattern 5 corresponds to the case of downward-sloping characteristics and can be applied when the minimum jitter value is more than a threshold. In the case of the pattern 5, three points including a reference pulse width, ((a reference pulse width)+0.2T) and ((a reference pulse width)+0.4T) are selected as a pulse width condition, judging from the idea that a medium to be recorded onto has considerably lower sensitivity than a reference medium. Subsequently, by a similar method to the case of the pattern 1, a power range is set for each of the pulse widths. Consequently, a test condition in the case of the pattern 5 involves the following three sets:
(1) A reference pulse width and a reference power range.
(2) (A reference pulse width)+0.2T, and (a reference power range)×(1−0.05×(+2)) mW.
(3) (A reference pulse width)+0.4T, and (a reference power range)×(1−0.05×(+4)) mW.

The pattern 6 corresponds to the case of upward-sloping characteristics and can be applied when the minimum jitter value is equal to a threshold or less. In the case of the pattern 6, three points including a reference pulse width, ((a reference pulse width)−0.1T) and ((a reference pulse width)−0.2T) are selected as a pulse width condition, judging from the idea that a medium to be recorded onto has slightly higher sensitivity than a reference medium. Subsequently, by a similar method to the case of the pattern 1, a power range is set for each of the pulse widths. Consequently, a test condition in the case of the pattern 6 involves the following three sets:

(1) A reference pulse width and a reference power range.
(2) (A reference pulse width)−0.1T, and (a reference power range)×(1-0.05×(−1)) mW.
(3) (A reference pulse width)−0.2T, and (a reference power range)×(1-0.05×(−2)) mW.

The pattern 7 corresponds to the case of upward-sloping characteristics and can be applied when the minimum jitter value is more than a threshold. In the case of the pattern 7, three points including a reference pulse width, ((a reference pulse width)−0.2T) and ((a reference pulse width)−0.4T) are selected as a pulse width condition, judging from the idea that a medium to be recorded onto has considerably higher sensitivity than a reference medium. Subsequently, by a similar method to the case of the pattern 1, a power range is set for each of the pulse widths. Consequently, a test condition in the case of the pattern 7 involves the following three sets:

(1) A reference pulse width and a reference power range.
(2) (A reference pulse width)−0.2T, and (a reference power range)×(1-0.05×(−2)) mW.
(3) (A reference pulse width)-0.4T, and (a reference power range)×(1-0.05×(−4)) mW.

The pattern 8 corresponds to the case of upwardly convex characteristics and can be applied when the maximum jitter value is more than a threshold. In the case of the pattern 8, ((a reference pulse width)±0.2T) is selected as a pulse width condition, judging from the idea that the characteristics are abnormal. Subsequently, by a similar method to the case of the pattern 1, a power range is set for each of the pulse widths. Consequently, a test condition in the case of the pattern 8 involves the following three sets:

(1) A reference pulse width and a reference power range.
(2) (A reference pulse width)−0.2T, and (a reference power range)×(1-0.05×(−2)) mW
(3) (A reference pulse width)+0.2T, and (a reference power range)×(1-0.05×(+2)) mW.

In addition, in case of the detection of a pattern other than the pattern 2 that is closest to a reference medium among these eight patterns, a jitter may again be detected by further reproducing the record from which the pattern is obtained in order to confirm that the pattern is not due to a reproducing error. In this case, if a pattern other than the pattern 2 is again detected by the further reproduction, a recording condition may be added and extended according to the condition shown in FIG. 14.

Furthermore, in case of the detection of the pattern 8 as a result of the above-described confirmation of the reproducing error, recording is again implemented with a reference pulse width before additional recording or pulse width extension. If the pattern 8 is once again detected by reproducing the recording, additional recording is implemented with a pulse width extension, i.e., the extension of the pulse conditions 2 and 3, instead of a power extension to measure a margin for the pulse condition 1. A power extension according to the extension of the pulse conditions 2 and 3 may be implemented by the above-described method.

In other words, in the case of the pattern 8, a margin cannot be ensured under the pulse condition 1, and therefore a power range that is a basis for a power extension cannot be obtained. Accordingly, an initial power condition is set as a reference power range.

Determination of Test Region: Determination of Power Range by Approximation Method A test region effective for obtaining an optimum solution with a smaller number of test runs is determined by implementing the above-described method. In addition, a method for the determination of a power range important to the determination of the test region will hereinafter be described.

In the present invention, to improve the accuracy of finding an optimum solution with the smallest possible number of test runs, a test condition is focused on the region wherein a jitter is equal to a threshold or less as described above. According to this concept, a power range to be used for test recording may be obtained from two power values that indicate a margin for a threshold. The margin for a threshold means a range wherein a characteristic value equal to a threshold or less can be obtained and the two power values mean values on the lower and higher power sides that define the margin range.

Considering the reduction in test recording time and the efficient use of a test recording region of a medium, such as a write-once medium, in which the test recording region is limited, the number of recording points for test recording is preferably smaller; however, a higher accuracy is much more needed for the power range determination described above because the power range is an important parameter as a criterion for an optimum recording condition.

Because obtaining an accurate power range leads to the test runs that are to be implemented intensively in a more accurately selected region, it contributes to the reduction in the number of test runs. For example, in the case of test recording at a rate of once per 0.1 mW, the test recording is implemented ten times for the power range of 1 mW and twenty test recordings for 2 mW. Accordingly, narrowing a power range contributes to the reduction in the number of test runs.

Hence, the present invention propounds a method for obtaining a desired margin amount by approximating a characteristic curve using some recorded points, in consideration of the recording quality of recording/reproducing signals that shows a variation like a quadratic curve having a extremal value as a optimum points against the variation in recording power. Application of such an approximation method allows a power range with a high accuracy to be easily obtained with some recorded points and can reduce the number of test runs.

Figure 15:
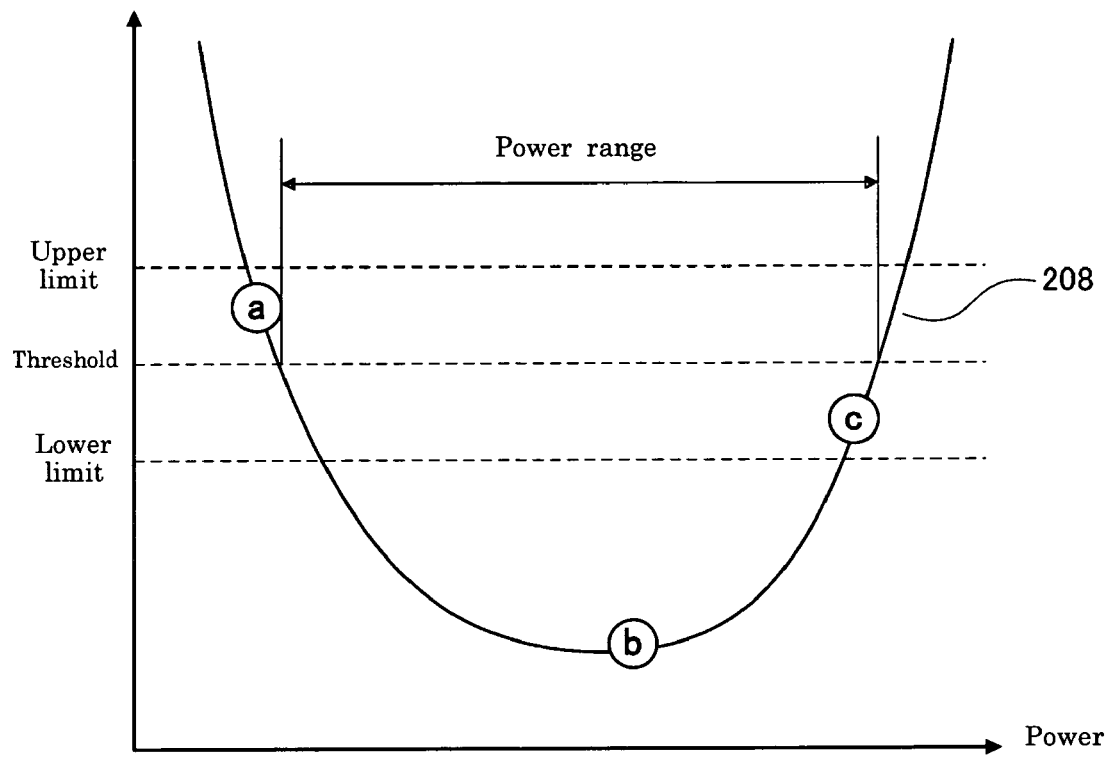
FIG. 15 is a conceptual diagram illustrating a method for the determination of a power range to be used at the step S122 in FIG. 3 by curve approximation.

FIG. 15 is a conceptual diagram illustrating the method for obtaining a power range, which is used at the step S122 in FIG. 3, by curve approximation. As shown in the diagram, two points a and c and a point b are first selected for the approximation, wherein the two points a and c are located on lower and higher power sides respectively and of which jitter values are in the vicinity of a threshold which is to be a criterion for recording characteristics; and a point b is located between the two points a and c and of which a jitter value is below the jitter values of the points a and c and the threshold, i.e., the points a, b and c to be selected have following relationships:

a>b, c>b and threshold>b.

The term "vicinity" of a threshold is defined as a range between upper and lower limits that are higher and lower than the threshold by certain amounts respectively, and preferably the upper and lower limits are set to be higher and lower than the threshold by 40% and 5% of it respectively. The a, b and c values are then approximated with a quadratic function and the region between the two intersecting points of the quadratic function with the threshold is applied to a power range. The range to be defined as a vicinity of a threshold may be varied, such as −5%~+40%, −10%~+30%, or the like, from time to time in consideration of the interval between two adjacent recorded points.

Figure 16:
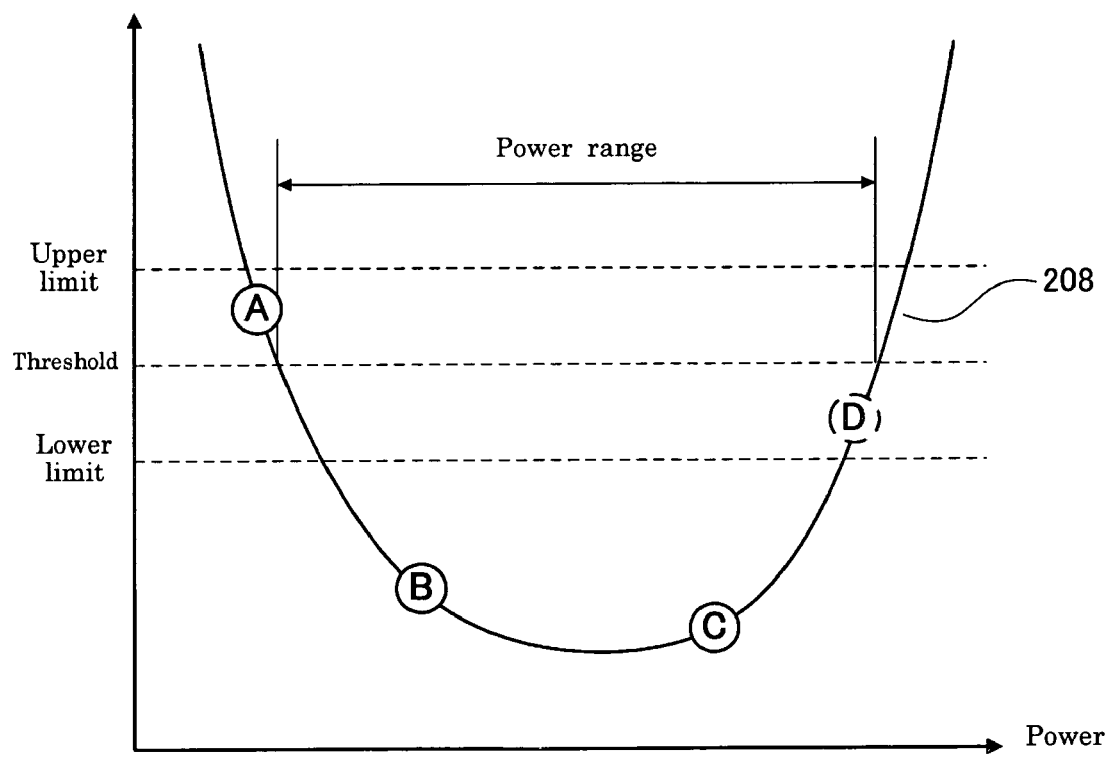
FIG. 16 is a conceptual diagram illustrating another example of the determination of a power range to be used at the step S122 in FIG. 3 by curve approximation.

FIG. 16 is a conceptual diagram illustrating another example of obtaining a power range, which is used at the step S122 in FIG. 3, by curve approximation. In case that a set of the three points A, B and C shown in the diagram does not meet the above described condition "a>b, c>b and threshold>b", it is preferable to obtain a value in the vicinity of a threshold by additional recording of the point D on a higher power side.

In addition, in the case of B>C as shown in the diagram, obtaining an approximate expression with the three points A, C and D without the use of the point B is preferable.

Because the relationships among the three recorded points and the threshold are "A>C, D>C and threshold>C", which are appropriate for drawing an approximated curve, the approximated curve with a high accuracy can be obtained with a three-point approximation. In addition, an additional recording condition for the point D may be determined depending on relationships among the recorded points A, B and C before the additional recording, i.e., "A>B and B>C", and on the threshold.

In case that a jitter value does not exist in the vicinity of the threshold on a lower power side, contrary to the case of FIG. 16, additional recording may be implemented under a lower power condition than the case of A. Also additional recording may be implemented under one or more recording conditions from time to time depending on relationships of recorded points and the threshold.

A power to be used for the additional recording condition may be varied with a power step different from a predetermined power step and a power condition included in the additional recording condition may be set based on a preliminarily obtained relationship of the variation in jitter to the variation in power.

In addition, in case that recorded points sufficient to determine a power range are not obtained even after recording with the additional recording condition described above, another recording point should again be obtained by adding a further recording condition in the same manner as described above.

In the case of a write-once medium of which a test recording region is limited, in order to avoid the use of a huge amount of test time, the number of the above-described additional recording conditions may have an upper limit as well as an additional recording power may have an upper limit not to exceed a laser power due to the addition of a recording condition.

Furthermore, in the above example, a power range is determined by a three-point approximation; however, a power range may be determined in such a way that two closest points to a threshold are first selected and then a range between two power values corresponding to the two closest points is applied to the power range.

An alternative method for selecting two points in the vicinity of a threshold may comprise, after recording is implemented while varying a power until two points located on either side of a threshold is found, selecting two closest points to the threshold among recorded points or selecting the two points located on either side of the threshold. The method will hereinafter be described in detail.

Determination of Test Region: Determination of Power Range by Sampling

Figure 17:
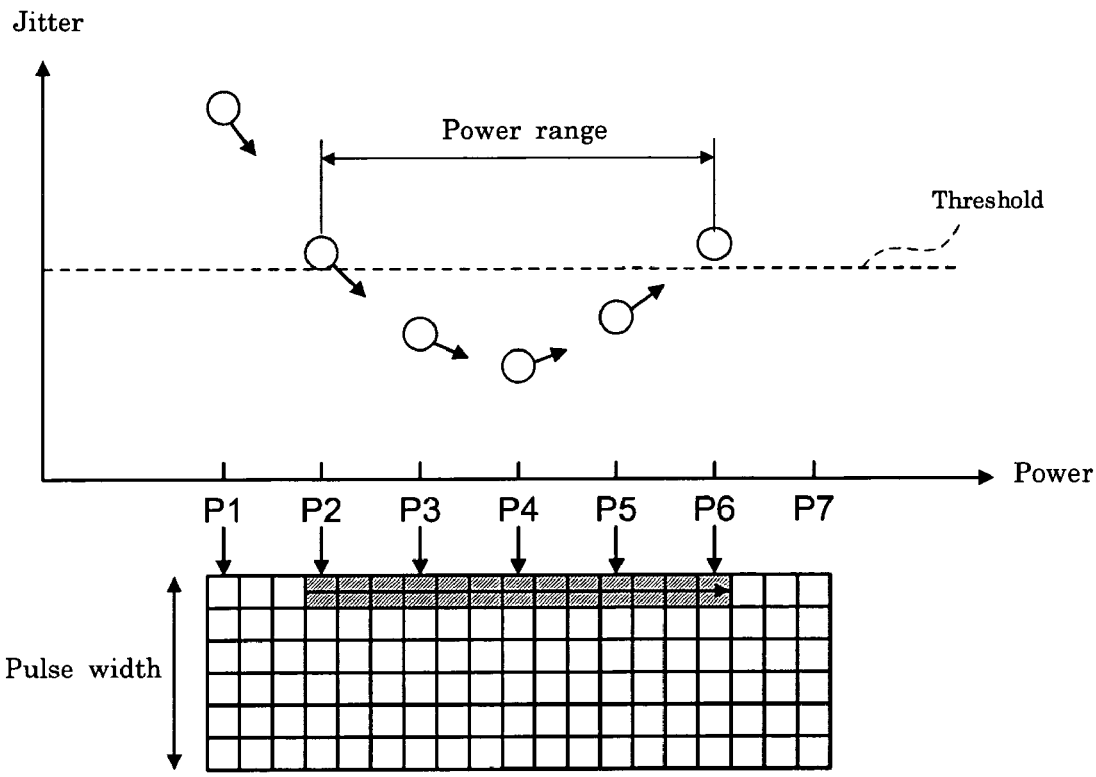
FIG. 17 is a conceptual diagram illustrating an example of the determination of a power range to be used at the step S122 in FIG. 3 by sampling.

FIG. 17 is a conceptual diagram illustrating an example of the determination of a power range, which is used at the step S122 in FIG. 3, by sampling. The example shows that a power range is determined based on two power values corresponding to the two closest points to a threshold, which are obtained after test recording while gradually varying a power until two values close to the threshold are obtained, instead of the use of the above-described three-point approximation.

In other words, as shown in the diagram, recording/reproducing is implemented while increasing a recording power sequentially from P1 to the P6 at which a jitter is equal to a threshold or more is obtained. As shown in a power/pulse width matrix in the diagram, a power range is determined as a range between P2 and P6 that are the two closest points to the threshold and located on lower and higher power sides respectively although the power varies from P1 to P6. In this manner, a power range can be determined by selecting two points located on either side of a threshold.

A method for selecting two points that are close to a threshold involves following methods, one of which may be selected and used from time to time:

(1) A method for selecting two points that define a power margin, i.e., selecting two points that are located in a power region meeting a reference reproducing value and are both the two closest points to the reference reproducing value among all the points.

(2) Selecting two points that are located slightly outside of a power margin and are both the two closest points to a reference reproducing value.

(3) Selecting two points that are located on a lower power side and on either side of a reference reproducing value.

(4) Selecting two points that are located on a higher power side and on either side of a reference reproducing value.

(5) Selecting two points that are located on lower and higher power sides respectively and on either side of a reference reproducing value and that are both the two closest points to a reference reproducing value.

In addition, an alternative method may further comprise selecting two intersecting points of an approximated curve, which is obtained using two points selected by any one of the above methods, with a reference reproducing value.

Determination of m'T/(n−m)T Ratio

Figure 18:
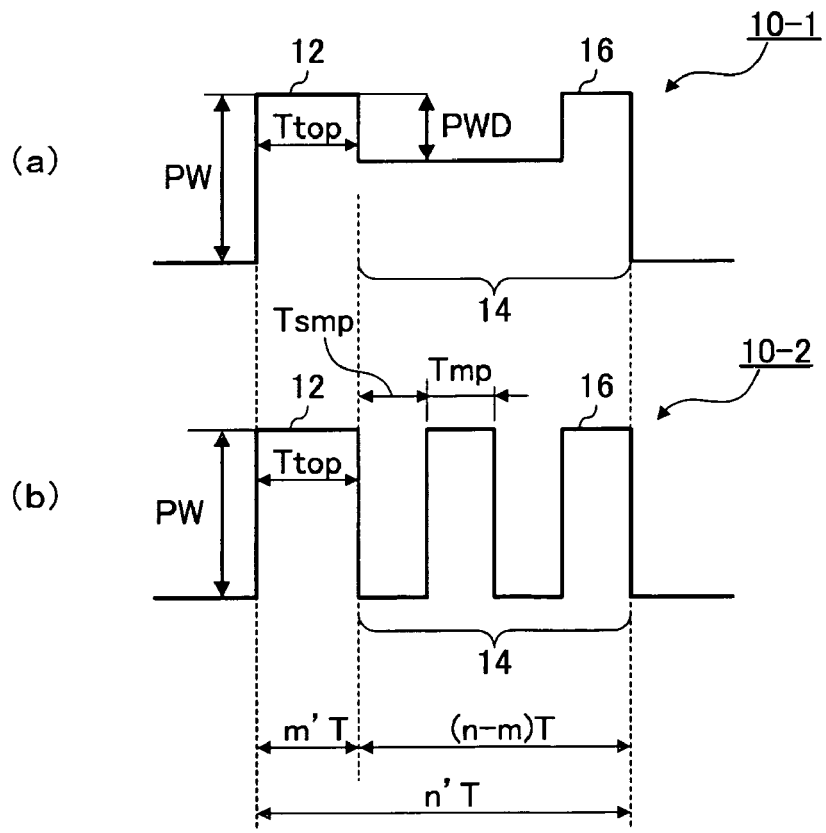
FIG. 18 is a conceptual diagram illustrating an example of a recording pulse to be used for the determination of a ratio at the step 200 shown in FIG. 1 (b).

FIG. 18 is a conceptual diagram illustrating an example of a recording pulse to be used for the determination of the ratio at the step 200 shown in FIG. 1 (b). FIG. 18 (a) is an example of the case where a single pulse comprised of a single pulse pattern is used and (b) an example of the case where a multi-pulse comprised of multiple pulses is used. As shown in the diagram, each of the single pulse 10-1 and the multi-pulse 10-2 is comprised of a top pulse 12 located at the forefront of the recording pulse and a following pulse 14 following the top pulse and comprises a back-end pulse 16 located at the end of the recording pulse.

An energy amount of the entire recording pulse is defined by the height of a main power PW and the length of a top pulse width Ttop defines an energy amount of the initial stage of the recording pulse that is provided to the front edge of a recording pit. The main power PW preferably corresponds to the highest value in each of the recording pulses 10-2 and 10-2, and the top pulse width Ttop has a width corresponding to the shortest recording pit having a length of 3T. Because the recording pulse having the shortest pulse width has the highest appearance probability and significantly influences recording quality, optimum conditions of the power PW and the width Ttop of the top pulse 12 are first determined by the use of the determination flow for an m'T condition described above.

Then, a condition of the following pulse 14 is determined by the use of a determination flow for an m'T/(n−m)T ratio. In the case of the single pulse 10-1, the following pulse comprises a power region lower than the main power PW by an amount of PWD as shown in FIG. 18 (*a*) and defining the PWD amount prevents a recording pit from forming the shape of a tear drop. Similarly, in the case of the multi-pulse 10-2 shown in FIG. 18 (*b*), defining either the width Tmp of an intermediate pulse located between the top pulse 12 and the back-end pulse 16 or a duty ratio of Tmp to Tsm prevents a recording pit from forming the shape of a tear drop. The determination of a condition for each of these following pulses is implemented by the use of a condition of the top pulse as a reference.

Figure 19:
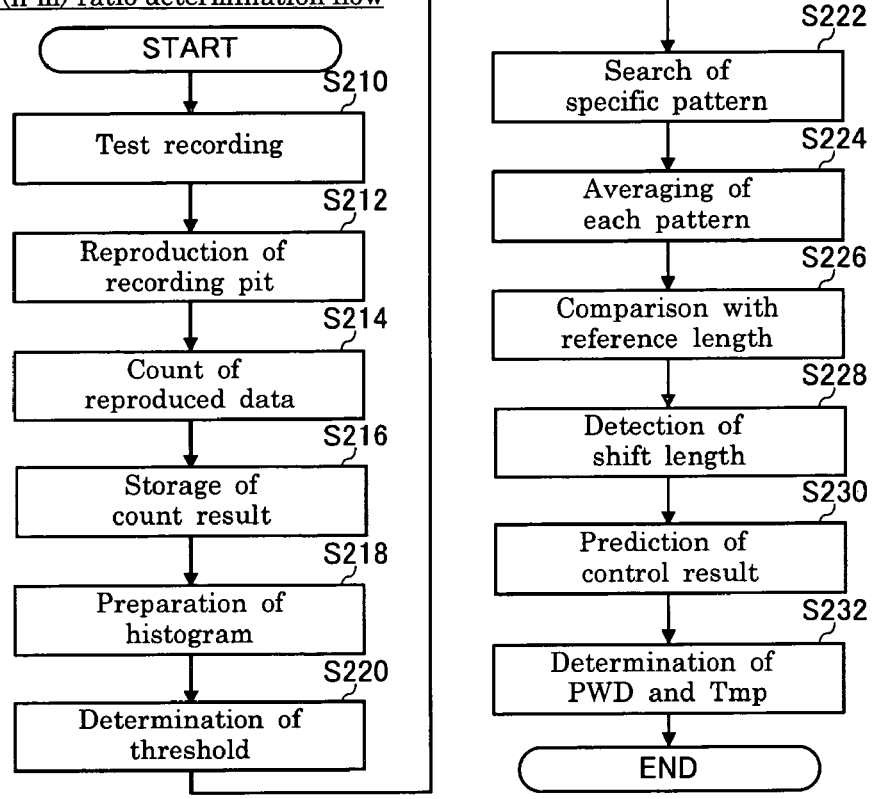
FIG. 19 is a flow chart illustrating an execution procedure of a flow for the ratio determination at the step S200 shown in FIG. 1 (b).

FIG. 19 is a flow chart illustrating an execution procedure of a flow for the ratio determination at the step S200 shown in FIG. 1 (*b*). As shown in FIG. 19, test recording onto the medium 50 is first implemented using the drive shown in FIG. 2 with a plurality of recording patterns having various (n−m)T conditions to set various parameters of a recording strategy which is to be implemented with a strategy circuit 102 (step S210). At the step 210, an mT pulse condition is fixed to a value obtained by the above-described determination flow for an m'T condition. Then, after the recorded patterns formed by the test recording are reproduced (step S212), reproduced binarized signals output from a binarization circuit 110 as a result of the reproduction are counted with a counter, which is synchronized with a predetermined clock, in a recording shift detection part 112 (step S214) and the lengths of pits and lands included in the reproduced binarized signals are stored in a storage region 115 as count data (step S216).

Then, a histogram illustrating an appearance frequency for every count is prepared in the recording shift detection part 112 by the use of the count data stored in the storage region 115 (step S218) and thresholds for count results that are to be criteria for the lengths of pits and lands are determined from the histogram (step S220).

Subsequently, in the recording shift detection part 112, various types of specific patterns including a specific pit/land pattern are searched from the count data stored in the storage region 115 using the thresholds as references (step S222) and average lengths of respective pits and respective lands comprising the specific patterns are evaluated by averaging count results for the pits considered to have the same pit length included in the specific patterns as well as by averaging count results for the lands considered to have the same land length (step S224).

Subsequently, in the recording shift detection part 112, one of the various types of specific patterns extracted is set as an extracted pattern, and by comparing the length of a recording pit included in the extracted pattern with a reference length (step S226), a shift length of the pit relative to the recording pulse is detected (step S228).

Subsequently, in an equation derivation part 113, an equation for determining an optimum strategy is derived based on the shift length detected in the recording shift detection part 112. Using the equation derived in the equation derivation part 113, a control result by the various parameters is predicted (step S230) in a strategy determination part 14. Further in the strategy determination part 14, PWD or Tmp shown in FIG. 18 is determined based on the prediction and then the determined PWD or Tmp is set to the strategy circuit 102 (step S232).

Figure 20:
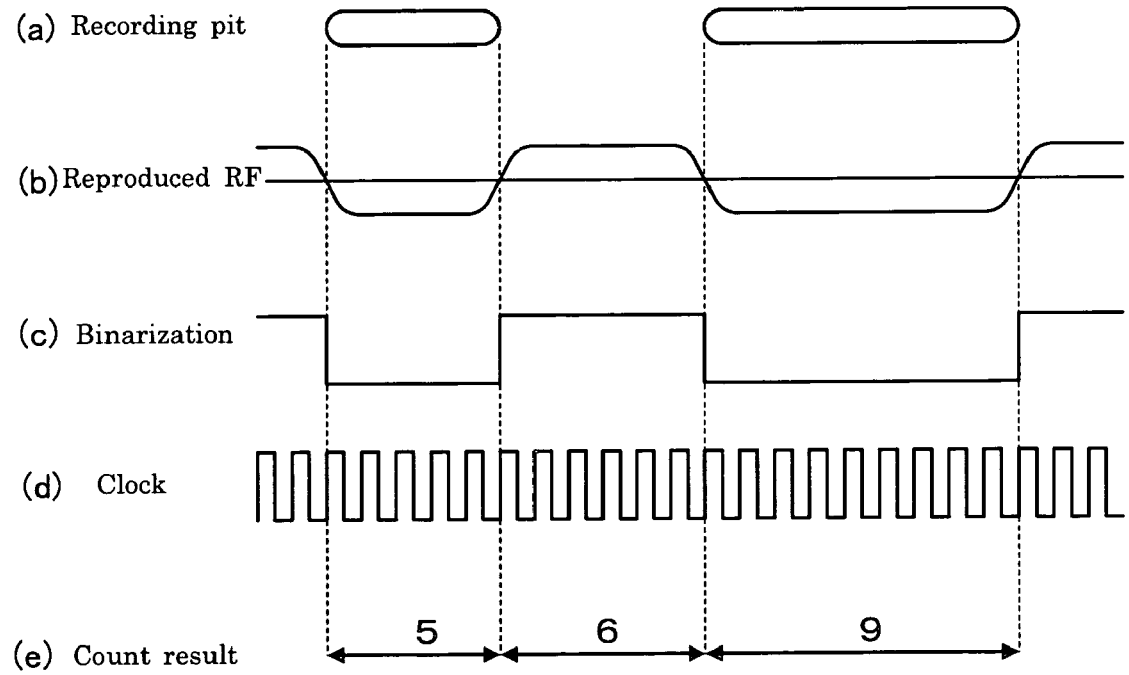
FIG. 20 is a conceptual diagram illustrating an operational concept from the test recording step to the step of the count of reproduced data shown in FIG. 19.

FIG. 20 is a conceptual diagram illustrating an operational concept from the test recording step (S210) to the step of the count of reproduced data (S214) in the flow shown in FIG. 19. As shown in the diagram, recording pits as shown in the diagram (a) are first formed on an optical disc when test recording is implemented. By reproducing the recording pits, a reproduced RF signal corresponding to the recording pits is obtained as shown in the diagram (b). A reproduced binarized signal as shown in the diagram (c) is obtained by binarizing the reproduced RF signal, and by counting pulse lengths between two adjacent polarity inversions of the binarized signal with a clock signal as shown in the diagram (d), count results are obtained as shown in the diagram (e).

FIG. 21 is a conceptual diagram illustrating the storage of the count results shown in FIG. 20. The count results obtained by counting the binarized signal with the clock signal for respective pits and lands, which can be delimited with polarity inversions, are stored in a table provided in the storage region 115 along with distinctive notations between a pit and a land in time-series sequence. The table shown in the diagram is to be stored later with a searchable address.

FIG. 22 is a conceptual diagram illustrating the preparation of a histogram (step S218) shown in FIG. 19. Two different histograms representing count tendencies for pits and lands (the diagram (a) and (b)) can be obtained by graphing appearance frequencies of counts for the pits and the lands respectively. Because each unit length nT (n=3, 4, 5, . . . 14) relative to a reference clock is inevitably determined in an optical disc, the distribution of appearance frequencies is obtained for the each unit length nT.

Figures 23, 24:
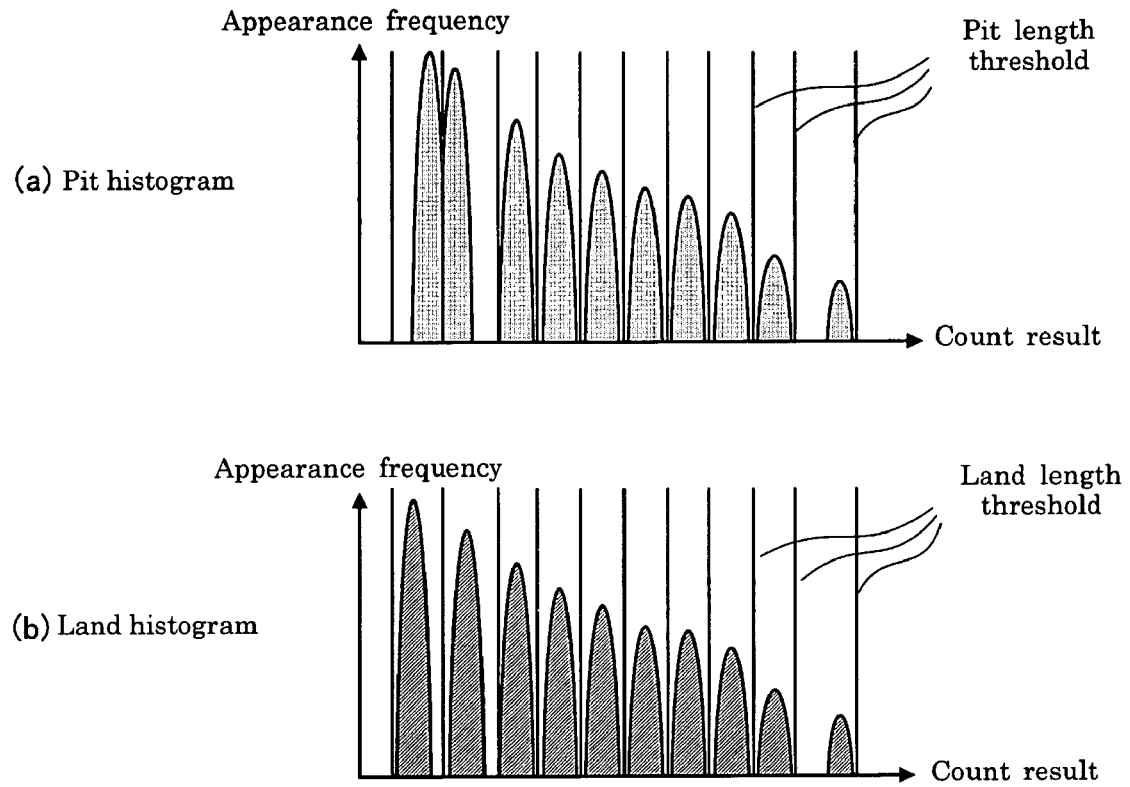
FIG. 23 is a conceptual diagram illustrating the determinations of thresholds shown in FIG. 19.
FIG. 24 is a conceptual diagram illustrating an example of the thresholds obtained by the method shown in FIG. 23.

FIG. 23 is a conceptual diagram illustrating the determination of a threshold (step S220) shown in FIG. 19. As shown in the diagram, because a valley portion between two adjacent peaks in the histograms can be used for a criterial threshold for each unit length nT, a pit length threshold to be a criterion for a pit length and a land length threshold to be a criterion for a land length are set in the pit and land histograms respectively.

FIG. 24 is a conceptual diagram illustrating an example of thresholds obtained by the method described in reference to FIG. 23. A pit length threshold is defined at a boundary between two adjacent pits and a land length threshold at a boundary between two adjacent lands as shown in the diagram (a) and (b) respectively. As shown in the diagram (a), for example, a threshold at the boundary between 2T and 3T is set as "count=2" and a threshold at the boundary between 3T and 4T as "count=9". Similarly, threshold setting is implemented to the boundary between 14T and 15T. Also in the diagram (b), a threshold at the boundary between 2T and 3T is set as "count=2" and a threshold at the boundary between 3T and 4T as "count=10". Similarly, threshold setting is implemented to the boundary between 14T and 15T.

Respective steps from the search of specific patterns (step S222) to the detection of shift lengths (step S228) in the flow shown in FIG. 19 will hereinafter be described in detail. These steps are implemented in the recording shift detection part 112, based on detection principles for various shifts.

Figures 25, 26:
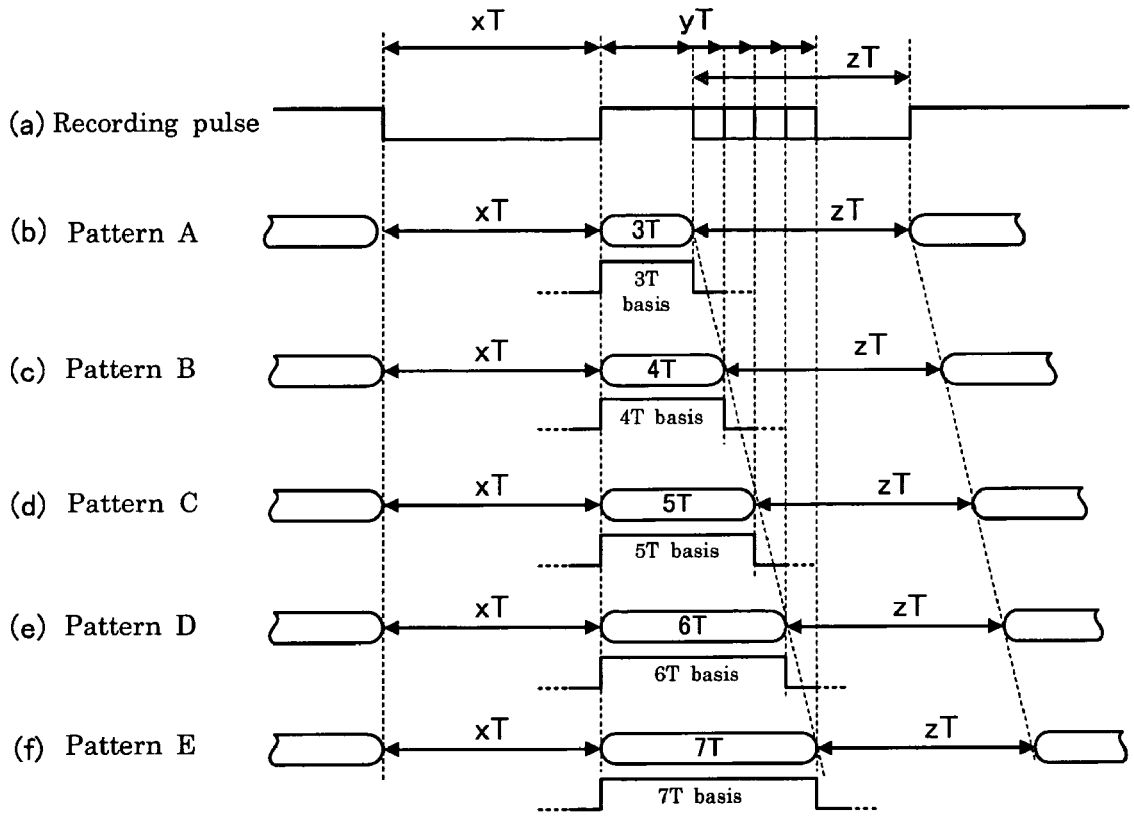
FIG. 25 is a diagram illustrating recording patterns to detect shift lengths due to a pit balance.
FIG. 26 is a conceptual diagram illustrating a table configuration for searching specific patterns to be used for the detection of the shift due to a pit balance.

FIG. 25 is a diagram illustrating each recording pattern to detect a shift length due to a pit balance. The pit balance is defined as a balance between top and following pulses. As shown in the diagram, when detecting a shift length due to a pit balance, test recording is implemented with a recording pulse shown in the diagram (a). The recording pulse includes a pattern successively comprising a land LxT, a pit PyT and a land LzT, wherein a land length of the land LxT and that of the land LzT are fixed while a pit length of the pit PyT is varied from 3T to 7T as shown in the diagram (b) to (f). In addition, the pit length of the variable pit PyT is varied to 14T although not shown in the diagram.

If the length of the variable pit is measured, the length should correspond to a predetermined pit length in an ideal recording condition.

However, in case that the length of the variable pit PyT is shifted relative to the predetermined pit length, the shift amount corresponds to a shift length of the pit length of the each pit P3T to P14T relative to each unit length 3T to 14T of the recording pulse generated with a strategy during recording because the lengths of the lands LxT and LzT are both fixed.

Accordingly, using a reproduced pattern for test recording implemented with a certain strategy, a shift length of each pit relative to the reference length can be detected by comparing a recorded length of each variable pit PyT with a reference length for the each pit.

FIG. 26 is a conceptual diagram illustrating a table configuration for searching specific patterns to be used for the detection of a shift due to a pit balance. When detecting a shift length due to a pit balance, data stored in the storage region 115 shown in FIG. 2 are searched (step S222 in FIG. 19) based on a set of threshold ranges for a land LxT, a pit PyT and a land LzT prepared for each specific pattern and a data row meeting the threshold ranges is extracted.

Subsequently, count results for each of the land LxT, the pit PyT and the land LzT are sorted and the sorted count results are then averaged for each of the land LxT, the pit PyT and the land LzT (step S224 in FIG. 19). By comparing a pattern as shown in FIG. 25 using the averaged value of the count results, a phase shift amount on the front side of each pit can be obtained.

Figure 27:
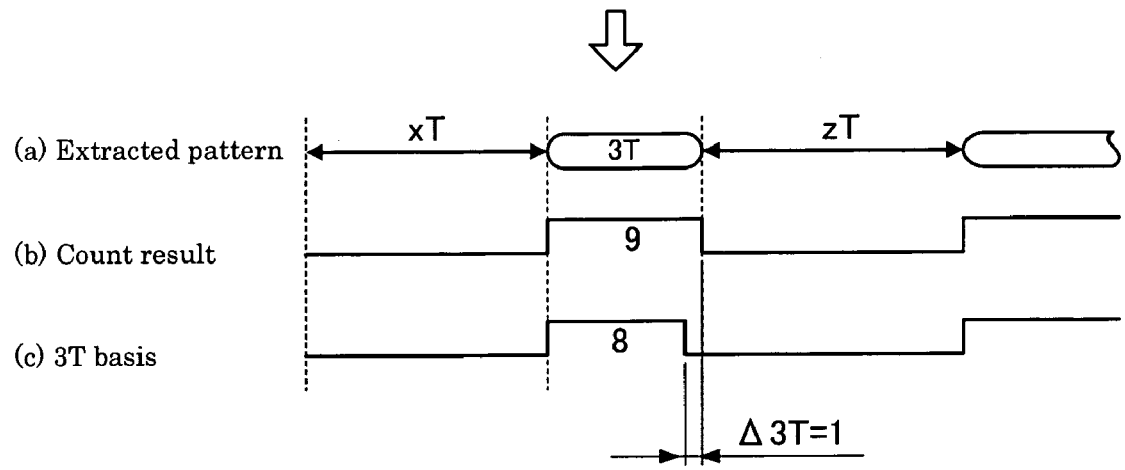
FIG. 27 is a conceptual diagram illustrating a specific example of a case where a shift length is detected by the absolute comparison of count results.

FIG. 27 is a conceptual diagram illustrating a specific example of a case where a shift length is detected by an absolute comparison of count results. When a shift length is detected by comparing with an ideal reference length, a specific pattern shown in the diagram (a) is first extracted from a group of data stored in a storage region, and then a count in the specific pattern and that for a reference length are compared with each other with respect to a part to be compared as shown in the diagrams (b) and (c). In this example, the part to be compared corresponds to a 3T pit, and the count "9" in the specific pattern and the count "8" for the corresponding reference length are compared with each other. Consequently, the difference between "9" and "8" is applied to the shift length for the 3T pit as "1".

Figure 28:
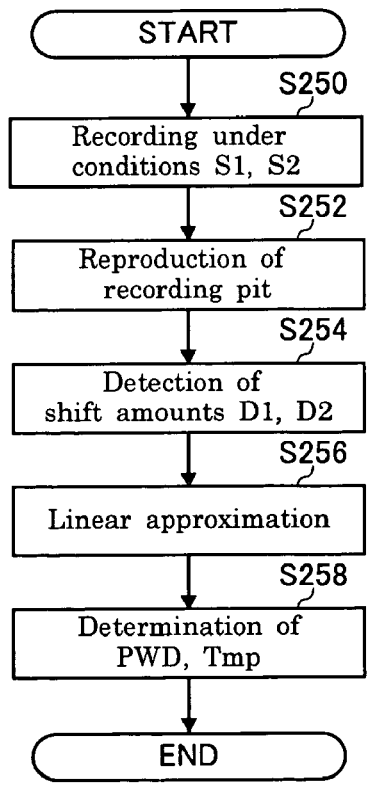
FIG. 28 is a flow chart illustrating an execution procedure of the prediction of a control amount shown in FIG. 19.

FIG. 28 is a flow chart illustrating an execution procedure of the prediction step of a control amount shown in FIG. 19. As shown in FIG. 28, the prediction of a control amount is implemented in such a way that test recording is first implemented under at least two different recording conditions S1 and S2 (step S250), then recording pits formed are reproduced (step S252), subsequently a shift length D1 for the condition S1 and a shift length D2 for the condition S2 are obtained by comparing the reproduced patterns (step S254), then the relationship between (S1, D1) and (S2, D2) is linearly approximated (step S256) and an optimum correction amount is finally determined by using the approximated line (step S258).

The shift lengths D1 and D2 detected as described above vary depending on various setting parameters of a strategy and have been found that the shift to vary almost linearly depending on various setting parameters of a strategy as a result of analysis.

In other words, a shift length to be obtained for each test recording in the above recording shift detection part 112 can be considered as a point on a line approximated by a least-square method.

Hence, in the drive of the present invention, an optimum strategy can be determined in consideration of a linear relationship between a set of various setting parameters of a strategy and a set of shift length D1 and D2 in the case of two test recordings. In addition, in the present invention, a curve approximation may also be used instead of the linear approximation for this purpose.

PWD in the case of a single pulse or Tmp in the case of a multi-pulse is a typical parameter to be varied depending on a recording condition S1 or S2. With varying the parameter from S1 to S2, the effect of the variation on a shift length is detected as a variation from D1 to D2. Using these four values, a linear approximation is implemented and the use of the approximated line results in obtaining a correction amount that can cancel a shift length.

Figure 29:
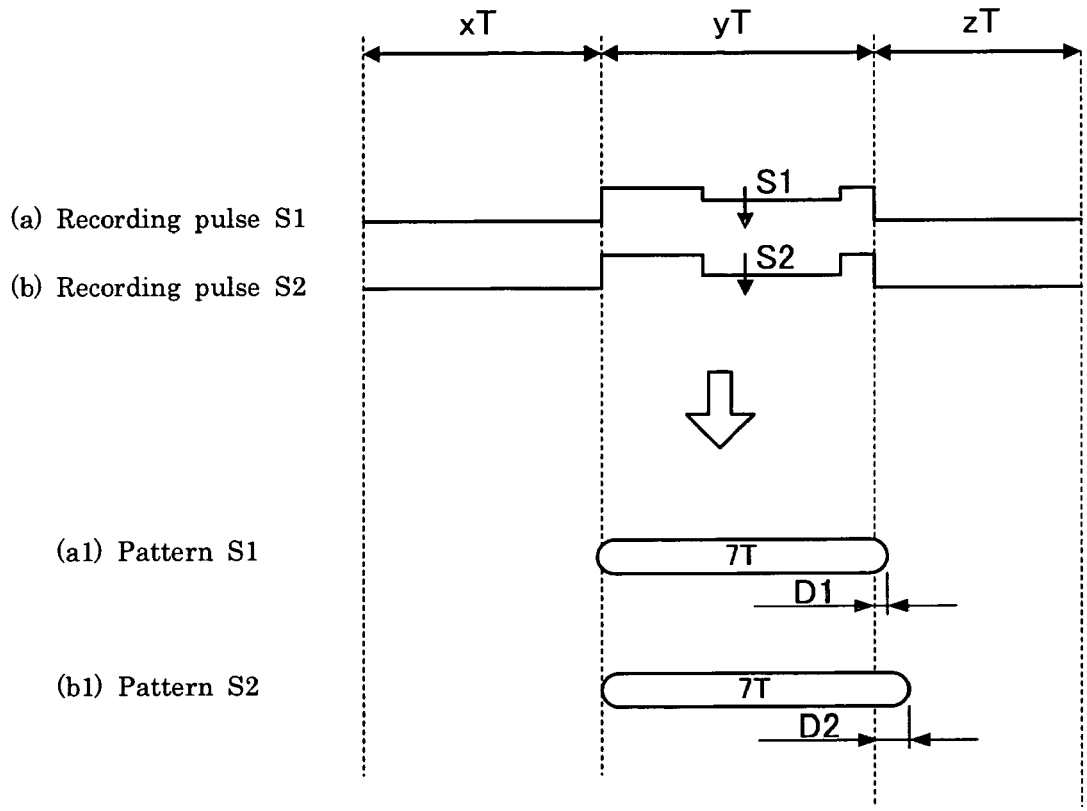
FIG. 29 is a conceptual diagram illustrating the relationship between the variation in recording condition, S1 to S2, and the variation in shift length, D1 to D2, when varying PWD.

FIG. 29 is a conceptual diagram illustrating the relationship between the variation in recording condition from S1 to S2 and the variation in shift length from D1 to D2 in the case of varying PWD. The PWD of a recording pulse S1 shown in the diagram (a) is varied by an amount of S1 and that of a recording pulse S2 in the diagram (b) by S2. Test recording is implemented under these two recording conditions.

As a result of the test recording, a pattern S1 shown in the diagram (a1) is obtained for the recording pulse S1 and a pattern S2 in the diagram (b1) for the recording pulse S2. A shift length of D1 arises in the pattern S1 according to the control (or variation) amount of S1 and a shift length of D2 in the pattern S2 according to the control amount of S2.

If the values of the shift lengths D1 and D2 for the control amounts S1 and S2 are known, a shift length arising from a control amount for any of the parameters will be predictable. Hence, using the relationship between the variation in control amount and the variation in shift length, the prediction of a control amount and the determination of a correction value will be implemented below.

Figure 30:
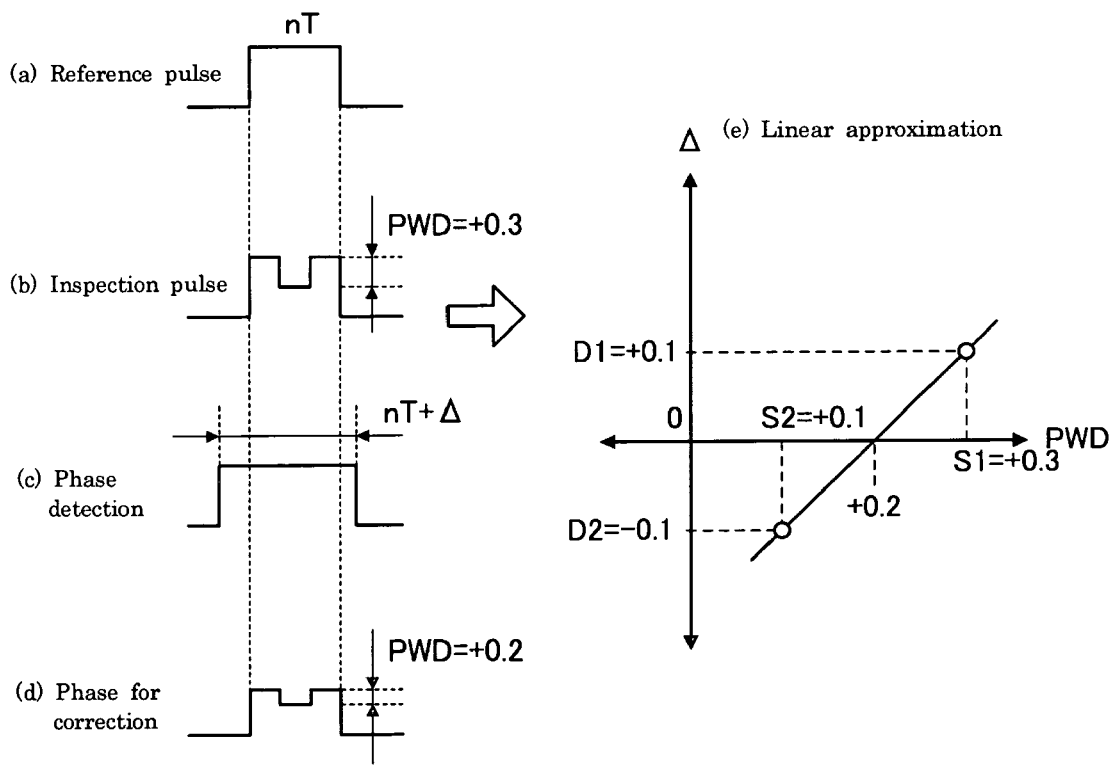
FIG. 30 is a conceptual diagram illustrating one example of a shift length correction using a linear approximation in the case of a single pulse.

FIG. 30 is a conceptual diagram illustrating one example of a shift length correction using a linear approximation in the case of a single pulse. When determining an correction amount PWD for a shift length, the center part of a reference pulse having a pulse length of nT shown in the diagram (a) is transformed, i.e., a pulse height for the part is reduced by an amount of PWD as shown in the diagram (b), and test recording is implemented with the transformed pulse. As a result of the test recording, the shift length Δ included in the reproduced signal is detected as shown in the diagram (c).

Also in the diagram, two different shift lengths Δ are obtained as D1=+0.1 and D2=−0.1 for two different PWD values S1=+0.3 and S2=+0.1 respectively, and the relationship between the shift length Δ, i.e., a controlled results, and the control amount PWD is obtained by a linear approximation using S1, S2, D1 and D2. Then, by using the line approximated, a correction amount of PWD=+0.2, which can cancel a shift length, is determined as an optimum correction amount. In the above procedure, a top pulse of the transformed pulse is not varied, but fixed.

As just described, the relationship between the variation in strategy from S1 to S2 and the variation in shift length from D1 to D2 can be obtained by a linear or curve approximation if at least two different points are obtained for each of the variations, and therefore an optimum correction amount leading to a zero shift length can be obtained by using the approximated line or curve.

More specifically, some shift lengths D are first obtained while varying a strategy S. Then, by substituting each of the shift lengths D obtained and corresponding strategy S into a general expression "D=a×S+b", simultaneous equations are obtained. By solving the simultaneous equations, constants a and b of the expression are evaluated, resulting in obtaining an optimum strategy S for an ideal shift length. Finally, by setting the optimum strategy S to the strategy circuit 102 shown in FIG. 2, a recording pulse can optimally be corrected.

For example, in case that a shift length detected from a reproduced pattern for test recording with some strategy S1 and another shift length detected from a reproduced pattern for test recording with another strategy S2 in the recording shift detection part 112 shown in FIG. 2 are D1 and D2 respectively, the following simultaneous equations are obtained:

$$D1=a \times S1+b,$$

$$D2=a \times S2+b.$$

From the above equations, the constants a and b are evaluated and the following function using the constants a and b evaluated is derived:

$$S=(D-b)/a.$$

By substituting a value to improve recording quality, for example, a shift length D to correct for an initial shift length or the like arising in an equalizer or the like, to the above function, an optimum strategy S can be determined.

Figures 31, 32:
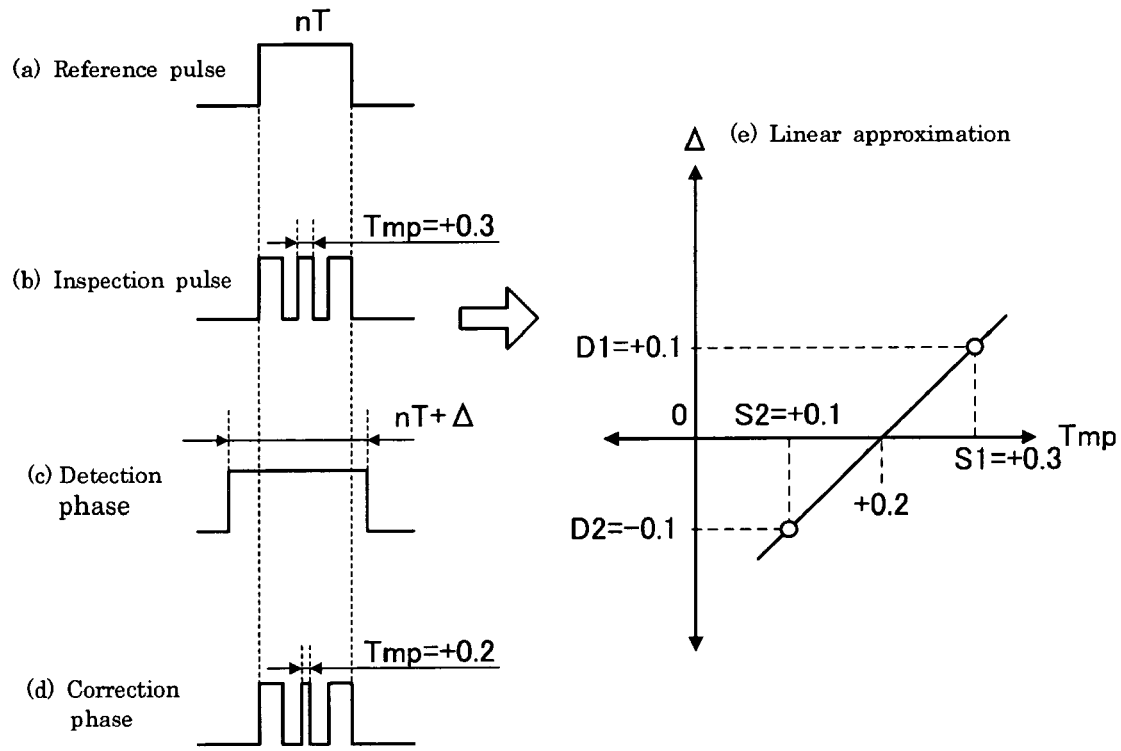
FIG. 31 is a conceptual diagram illustrating one example of a shift length correction using a linear approximation in the case of a multi-pulse.
FIG. 32 is a conceptual diagram illustrating a table configuration for storing correction amounts PWD and Tmp.

FIG. 31 is a conceptual diagram illustrating one example of a shift length correction using a linear approximation in the case of a multi-pulse. When determining a correction amount Tmp for a shift length, a reference pulse having a pulse length of nT shown in the diagram (a) is transformed so as to have an intermediate pulse with a pulse length of Tmp as shown in the diagram (b), and test recording is implemented with the transformed pulse. As a result of the test recording, the shift length Δ included in the reproduced signal is detected as shown in the diagram (c). In this procedure, a top pulse of the transformed pulse is not varied, but fixed.

Also in the diagram, two different shift lengths Δ are obtained as D1=+0.1 and D2=−0.1 for two different Tmp values S1=+0.3 and S2=+0.1 respectively, and the relationship between the shift length Δ, i.e., a controlled results, and the control amount Tmp is obtained by a linear approximation using S1, S2, D1 and D2. Then, by using the line approximated, a correction amount of Tmp=+0.2, which can cancel a shift length, is determined as an optimum correction amount.

FIG. 32 is a conceptual diagram illustrating a table configuration for storing correction amounts PWD and Tmp. As shown in the diagram, the correction amounts PWD and Tmp are determined for each of pit lengths to be corrected. For example, in case that the pit to be corrected is 3T, correction amounts PWD and Tmp are stored in the regions indicated by "PW3" and "Tm3" respectively in the diagram. Also in each of the other cases from 4T to 14T, correction amounts PWD and Tmp are stored in a similar manner to the case of 3T.

Figure 33:
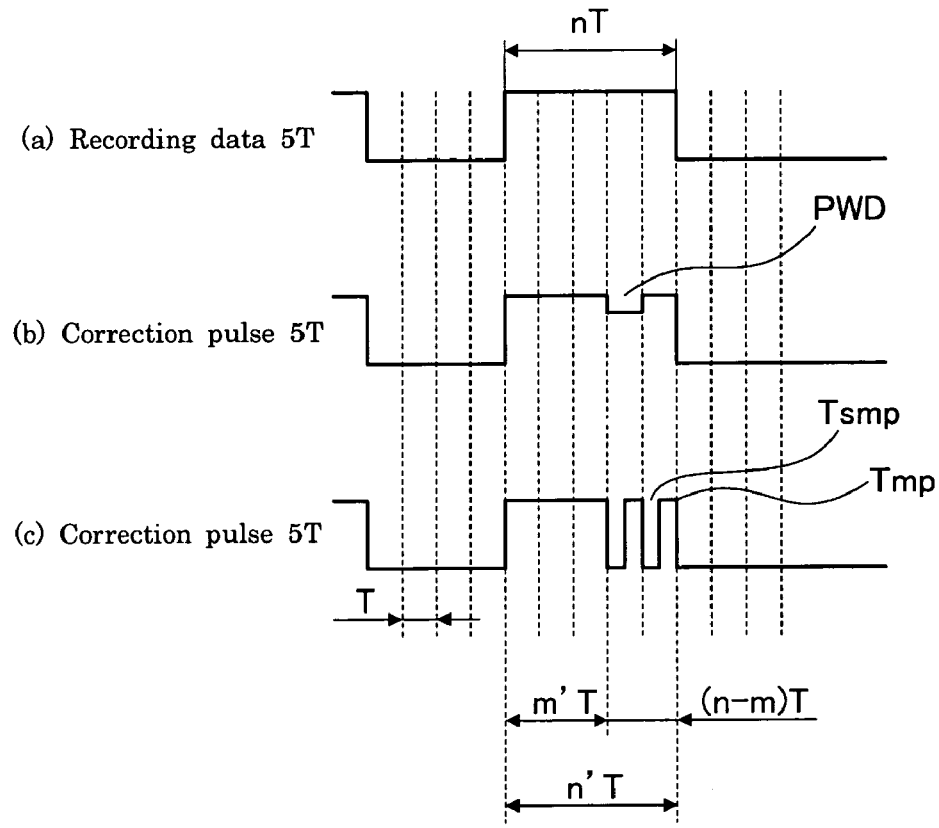
FIG. 33 is a conceptual diagram illustrating the configuration of an nT pulse to be configured at the step S300 in FIG. 1.

FIG. 33 is a conceptual diagram illustrating the configuration of an nT pulse to be configured at the step S300 in FIG. 1. For example, as shown in the diagram (a), a recording datum for forming a 5T pit is output as a pulse signal with a pulse length of nT corresponding to the length of five cycles of a clock signal. A pulse for the recording datum after correction is output as a pulse signal with a length of n'T comprising a top pulse with a length of m'T as shown in the diagrams (b) and (c). In the case of a single pulse, PWD is defined within a (n−m)T part of the pulse signal as shown in the diagram (b). On the other hand, in the case of a multi-pulse, Tmp is defined also within a (n−m)T part of the pulse signal as shown the diagram (c).

Because the PWD and Tmp take values obtained under the fixed top pulse condition, the values are with reference to an optimum m'T/(n−m)T ratio determined based on an mT pulse condition. Accordingly, the nT pulse comprised of the top and following pulses is appropriate to improve recording quality, however, at this moment, a phase condition has not yet been determined, and therefore a phase condition determination flow to be described below is further implemented to obtain an optimized strategy.

Correction for Phase Shift

Figure 34:
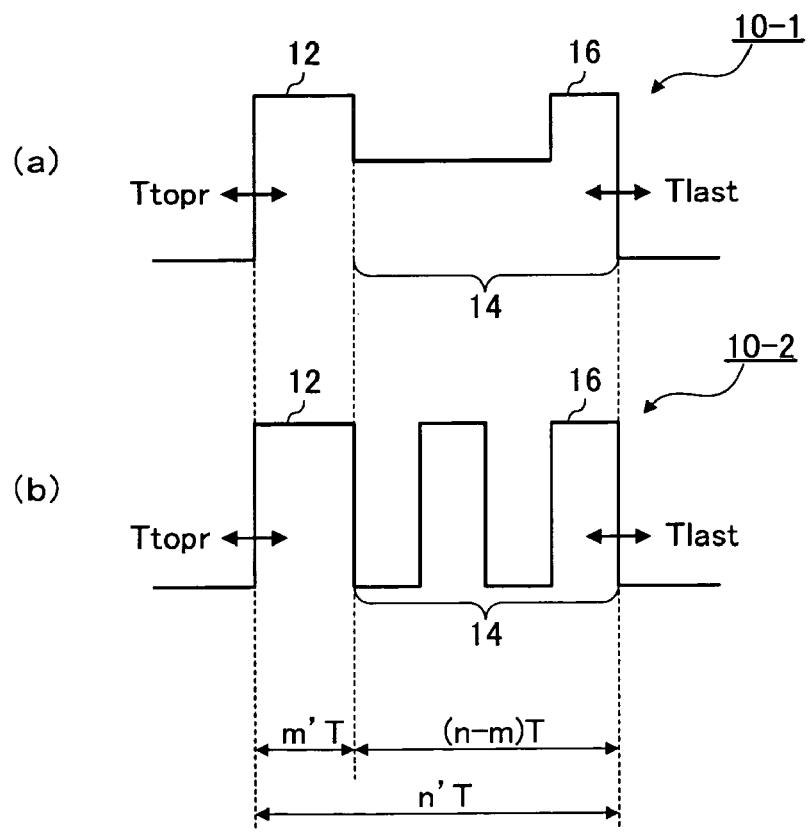
FIG. 34 is a conceptual diagram illustrating an example of a test recording pulse to be used for a phase shift correction at the step S400 shown in FIG. 1 (b).

FIG. 34 is a conceptual diagram illustrating an example of a test recording pulse to be used for the phase shift correction at the step S400 shown in FIG. 1 (b). FIG. 34 (a) shows an example of a case where a single pulse comprised of a single pulse pattern is used and (b) an example of a case where a multi-pulse comprised of multiple pulses is used.

In either case of the single pulse 10-1 or the multi-pulse 10-2, Ttopr for adjusting a start position of a top pulse 12 and Tlast for adjusting an end position of a back-end pulse 16 are set as a phase condition for the recording pulse. By adjusting these values, a pit length after recording is further optimized. In addition, the phase condition is determined by test recording based on the top pulse and following pulse conditions determined by the preceding flow.

Figure 35:
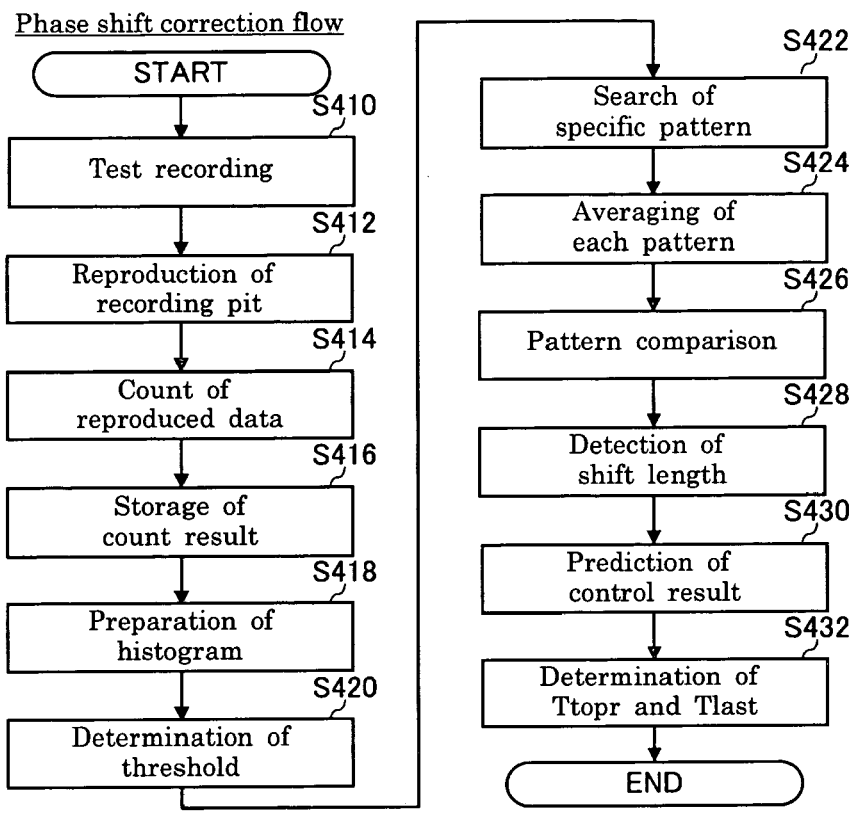
FIG. 35 is a flow chart illustrating an execution procedure of the determination flow for a phase condition at the step S400 shown in FIG. 1 (b).

FIG. 35 is a flow chart illustrating an executing procedure of the phase condition determination flow at the step S400 shown in FIG. 1 (b). As shown in FIG. 35, test recording onto the medium 50 is first implemented using the drive shown in FIG. 2 with each of various recording patterns having various phase conditions for an nT pulse comprised of an mT pulse and a (n−m)T pulse (step S410). At the step S410, the mT pulse and (n−m)T pulse conditions are fixed to values obtained by the preceding flow. Then, after the recorded pattern formed by the test recording is reproduced (step S412), reproduced binarized signal output from the binarization circuit 110 as a result of the reproduction is counted with a counter, which is synchronized with a predetermined clock, in the recording shift detection part 112 (step S414), and the lengths of pits and lands included in the reproduced binarized signals are stored in a storage region 115 as count data (step S416).

Subsequently, a histogram illustrating an appearance frequency for every count is prepared in the recording shift detection part 112 by the use of the count data stored in the storage region 115 (step S418) and thresholds for count results that are to be criteria for the length of pits and lands are determined from the histogram (step S420).

Subsequently, in the recording shift detection part 112, various types of specific patterns including a specific pit/land pattern are searched from the count data stored in the storage region 115 using the thresholds as references (step S422) and average lengths of pits and lands comprising the specific patterns are respectively evaluated by averaging count results considered to be for the same pit length included in the specific patterns as well as by averaging count results considered to be for the same land length (step S424).

Subsequently, in the recording shift detection part 112, one of the various types of specific patterns extracted is set as a reference pattern, and comparing the reference pattern with other patterns (step S426) leads to the independent detection of each of the following shift amounts (step S428):

(1) A phase shift amount on the front side of a pit relative to a recording pulse.
(2) A phase shift amount on the rear side of a pit relative to a recording pulse.
(3) A shift length of a pit due to thermal interference relative to a recording pulse.

Subsequently, in the equation derivation part 113, an equation for determining an optimum strategy is derived based on the shift amount detected in the recording shift detection part 112. Using the equation derived in the equation derivation part 113, a control result for various parameters is predicted (step S430) in the strategy determination part 114. Further in the strategy determination part 114, based on the prediction, Ttopr and Tlast shown in FIG. 34 are determined and then these values are set to the strategy circuit 102 (step S432).

Several steps of the flow shown in FIG. 35, from the test recording step S410 to the averaging step S424, are not described in detail because these steps are implemented in a similar manner to the procedure shown in FIGS. 20 to 24.

Figure 36:
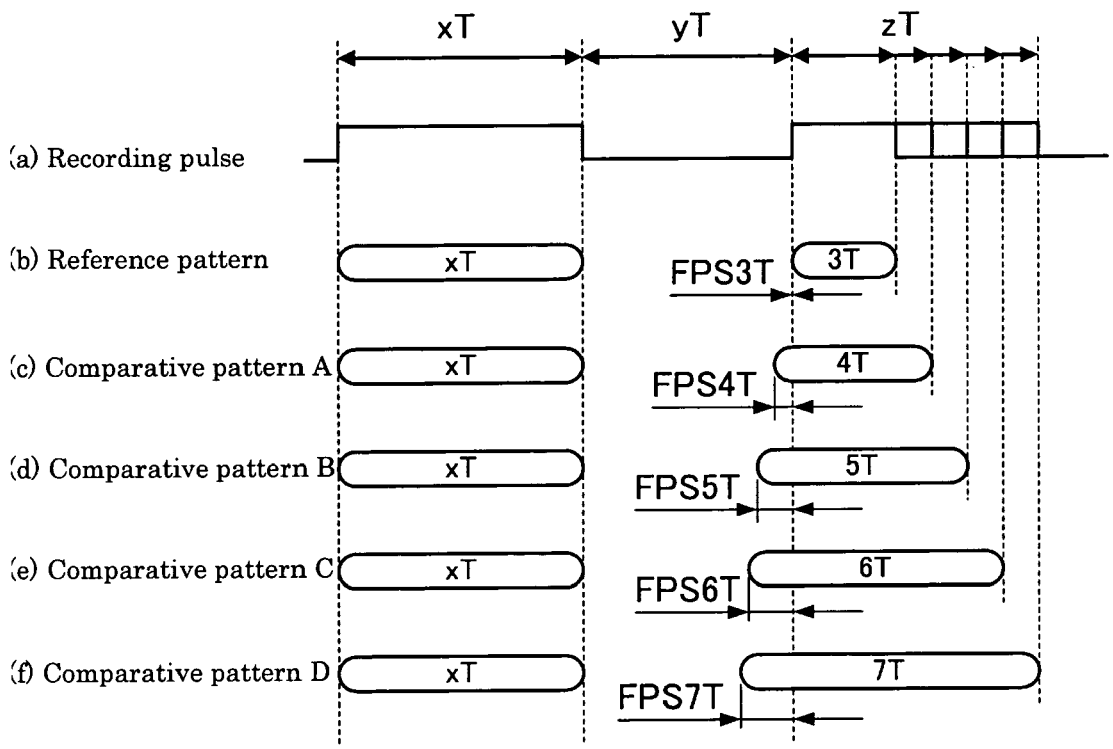
FIG. 36 is a conceptual diagram illustrating recording patterns to detect a phase shift amount on the front side of each pit.

FIG. 36 is a conceptual diagram illustrating recording patterns to detect a phase shift amount on the front side of each pit. As shown in the diagram, when detecting a phase shift amount on the front side of the each pit, test recording is implemented with a recording pulse shown in the diagram (a). The recording pulse includes a pattern successively comprising a fixed pit PxT, a fixed land LyT and a variable pit PzT, wherein a pit length of the fixed pit PxT and a land length of the fixed land LyT are fixed while a pit length of the variable pit PzT is varied from 3T to 7T as shown in the diagrams (b) to (f). In addition, the pit length of the variable pit PzT is varied to 14T although not shown in the diagram.

If the length of the fixed land LyT in each of the recording patterns is measured, the length should be constant in an ideal recording condition. However, in case that the length of the fixed land LyT is shifted relative to a predetermined length, the shift length relative to the predetermined length corresponds to the phase shift amount on the front side of each of the pits P3T to P14T corresponding to the unit lengths 3T to 14T of recording pulses generated with a strategy during recording because the length of the fixed pit PxT is fixed.

Accordingly, by comparing the length of a fixed land LyT in a reference pattern with a length of a fixed land LyT in each comparative pattern, the phase shift amount on the front side of the each comparative pattern relative to the reference pattern can be obtained as FPS4T, FPS5T, FPS6T or FPS7T, where the reference pattern means a pattern in which the length of the variable pit PzT is 3T as shown in the diagram (b) and the comparative pattern means any of the other patterns as shown in the diagrams (c) to (f).

The phase shift amount, FPS4T, FPS5T, FPS6T or FPS7T, may be detected as a relative value based on a certain position, and therefore a phase shift amount on the front side of the reference pattern FTS3T may be defined as zero or as a shift amount relative to an ideal length. Also any one of the patterns shown in the diagram (c) to (f) may be defined as a reference pattern instead of the pattern shown in the diagram (b).

Figure 37:
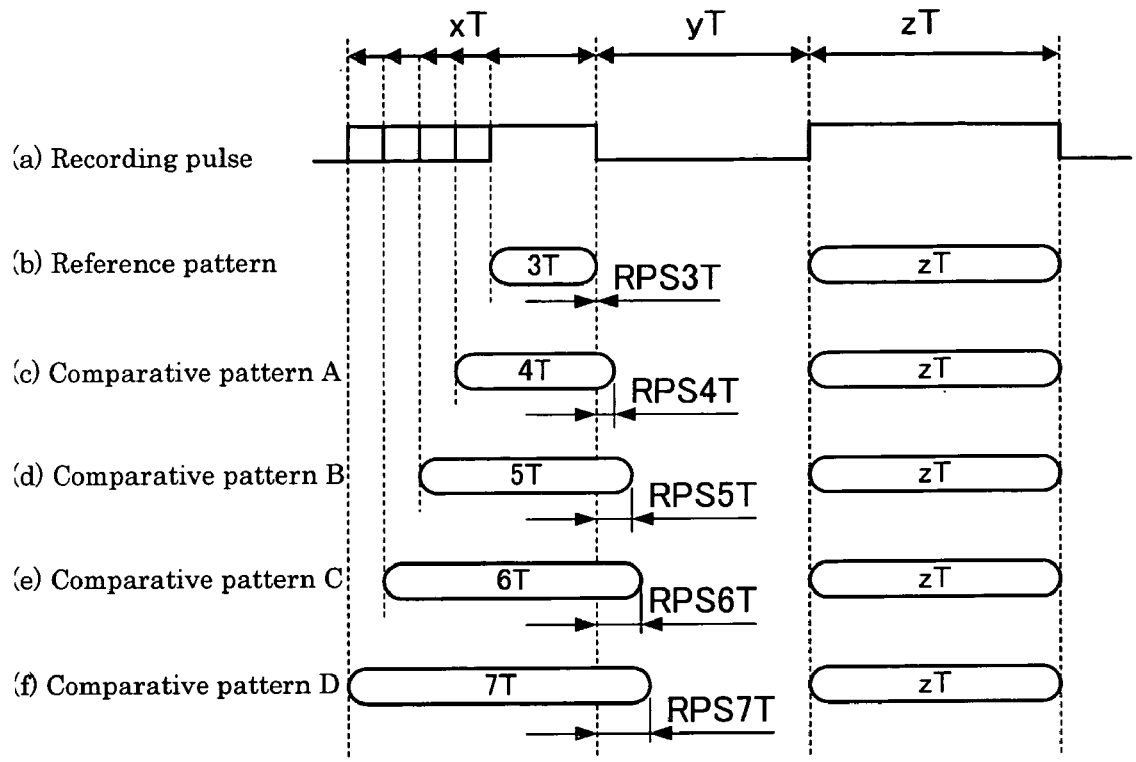
FIG. 37 is a conceptual diagram illustrating recording patterns to detect a phase shift amount on the rear side of each pit.

FIG. 37 is a conceptual diagram illustrating recording patterns to detect a phase shift amount on the rear side of each pit. As shown in the diagram, when detecting a phase shift amount on the rear side of the each pit, test recording is implemented with a recording pulse shown in the diagram (a). The recording pulse includes a pattern successively comprising a variable pit PxT, a fixed land LyT and a fixed pit PzT, wherein a land length of the fixed land LyT and a pit length of the fixed pit PzT are fixed while a pit length of the variable pit PxT is varied from 3T to 7T as shown in the diagrams (b) to (f). In addition, the pit length of the variable pit PxT is varied to 14T although not shown in the diagram.

If the length of the fixed land LyT in each of the recording patterns is measured, the length should be constant in an ideal recording condition. However, in case that the length of the fixed land LyT is shifted relative to a predetermined length, the shift length relative to the predetermined length corresponds to a phase shift amount on the rear side of each of the pits P3T to P14T corresponding to the unit lengths 3T to 14T of recording pulses generated with a strategy during recording because the length of the fixed pit PzT is fixed.

Accordingly, by comparing the length of a fixed land LyT in a reference pattern with a length of a fixed land LyT in each comparative pattern, the phase shift amount on the rear side of the each comparative pattern relative to the reference pattern can be obtained as RPS4T, RPS5T, RPS6T or RPS7T, where the reference pattern means a pattern in which a length of the variable pit PxT is 3T as shown in the diagram (b) and the comparative pattern means any of the other patterns as shown in the diagrams (c) to (f).

The phase shift amount, RPS4T, RPS5T, RPS6T or RPS7T, may be detected as a relative value based on a certain position, and therefore a phase shift amount on the rear side of the reference pattern RTS3T may be defined as zero or as a shift amount relative to an ideal length. Also any one of the patterns shown in the diagrams (c) to (f) may be defined as a reference pattern instead of the pattern shown in the diagram (b).

Figure 38:
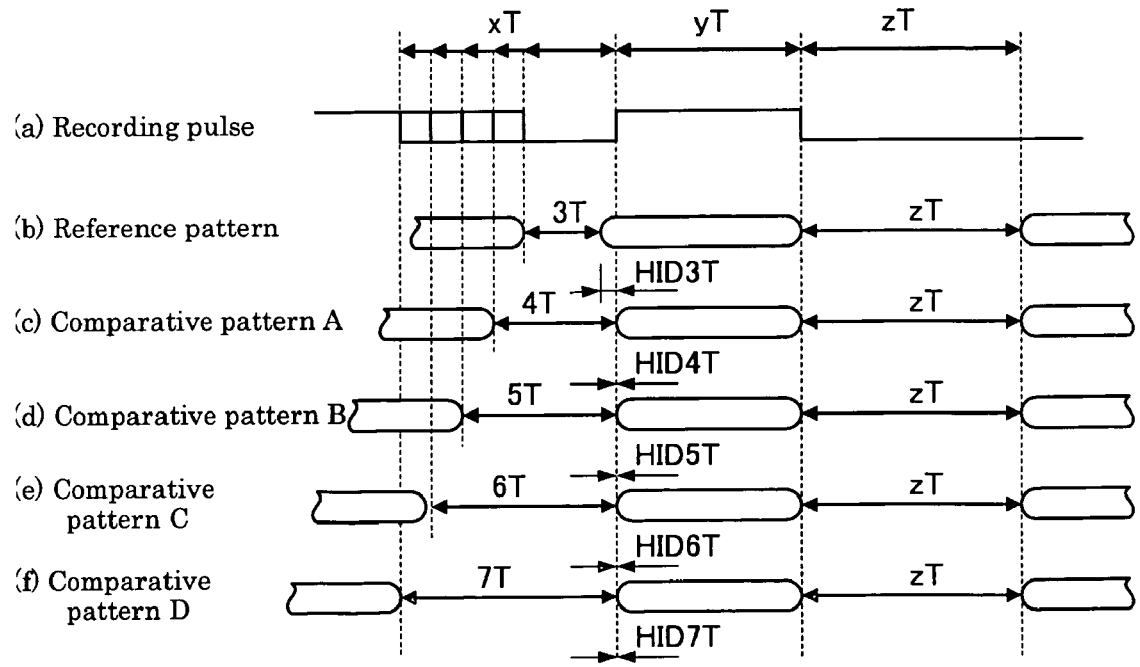
FIG. 38 is a conceptual diagram illustrating recording patterns to detect a shift length of each pit due to thermal interference.

FIG. 38 is a conceptual diagram illustrating recording patterns to detect a shift length of each pit due to thermal interference. As shown in the diagram, when detecting a shift length of the each pit, test recording is implemented with a recording pulse shown in the diagram (a). The recording pulse includes a pattern successively comprising a land LxT, a pit PyT and a land LzT, wherein a pit length of the fixed pit PyT and a land length of the fixed land LzT are fixed while a land length of the variable land LxT is varied from 3T to 7T as shown in the diagrams (b) to (f). In addition, the land length of the variable land LxT is varied to 14T although not shown in the diagram.

If the length of the fixed pit PyT in each of the recording patterns is measured, the length should be constant in an ideal recording condition. However, in case that the length of the fixed pit PyT is shifted relative to a predetermined length, the shift length relative to the predetermined length corresponds to a shift length due to thermal interference arising from a pit formed immediately before the each variable land LxT because the length of the fixed land LzT is fixed.

Accordingly, by comparing the length of a fixed pit PyT in a reference pattern with the length of a fixed pit PyT in each comparative pattern, the shift amount on the front side of the each comparative pattern relative to the reference pattern can be obtained as HID4T, HID5T, HID 6T or HID7T, where the reference pattern means a pattern in which the length of the variable land LxT is 3T as shown in the diagram (b) and the comparative pattern means any of the other patterns as shown in the diagrams (c) to (f).

The shift amount, HID4T, HID5T, HID 6T or HID7T, may be detected as a relative value based on a certain position, and therefore a shift amount on the front side of the reference pattern HID3T may be defined as zero or as a shift amount relative to an ideal length. Also any one of the patterns shown in the diagrams (c) to (f) may be defined as a reference pattern instead of the pattern shown in the diagram (b).

FIG. 39 is a conceptual diagram illustrating a table configuration for searching specific patterns to be used for the detection of a phase shift on the front side of a pit as well as for the detection of a phase shift on the rear side of a pit. In the case of the detection of a phase shift on the front side of a pit, based on a set of threshold ranges for a pit PxT, a land LyT and a pit PzT prepared for each specific pattern shown in the diagram (a), data stored in the storage region 115 in FIG. 2 are searched (equivalent to the step S422 in FIG. 35), resulting in the extraction of a data row meeting the threshold ranges.

Then, count results corresponding to each of a pit PxT, a land LyT and a pit PzT are sorted and averaged (equivalent to the step S424 in FIG. 35). By implementing the above-described pattern comparison using the averaged values of the count results, a phase shift amount on the front side of each pit can be obtained. FIG. 39 (b) shows an example of a threshold range table in the case of the detection of a phase shift on the rear side of a pit, and the organization and manner of operation of the table are same as the case of the detection of a phase shift on the front side of a pit.

FIG. 40 is a conceptual diagram illustrating a table configuration for searching specific patterns to be used for detecting a phase shift of a pit due to thermal interference. As shown in the diagram, the detection of a phase shift of a pit due to thermal interference is implemented in the same manner as the detection of a phase shift on the front or rear side of a pit described above in reference to FIG. 39.

Figure 41:
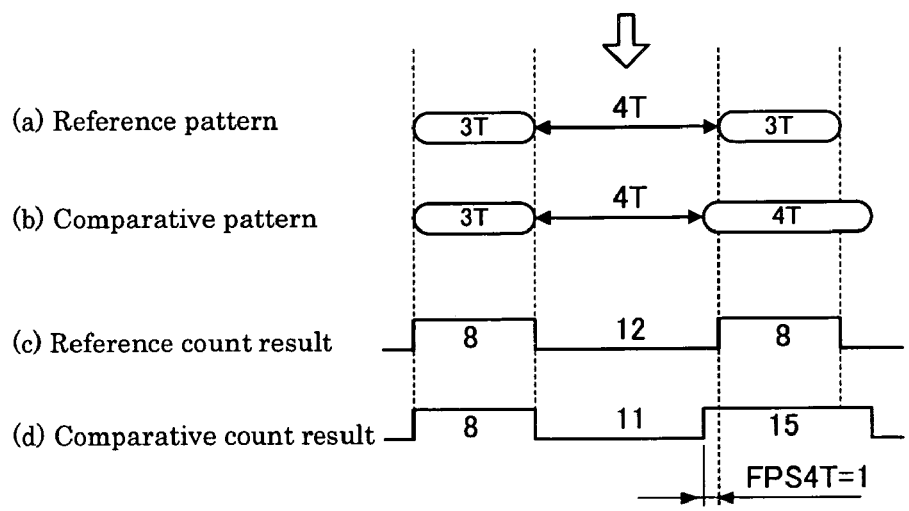
FIG. 41 is a conceptual diagram illustrating a specific example of the case where a shift amount is detected by the relative comparison of count results.

FIG. 41 is a conceptual diagram illustrating a specific example of the case where a shift amount is detected by the relative comparison of count results. The diagram shows an example of the case where a phase shift on the front side of a pit is detected; however, the detection of any other shift amount is also implemented in the same manner. When detecting a shift amount, a reference pattern and a comparative pattern shown in the diagrams (a) and (b) respectively are first searched and extracted from a group of data stored in a storage region. Then, as shown in the diagrams (c) and (d), two count values are compared with each other for a part that should essentially have a fixed length. In the example, because a land LyT is a comparative part, a difference between a count of "12" for the reference pattern shown in the diagram (c) and a count of "11" for the comparative pattern shown in the diagram (d) is obtained, and consequently a shift amount FPS4T can be obtained as the difference of "1".

Figure 42:
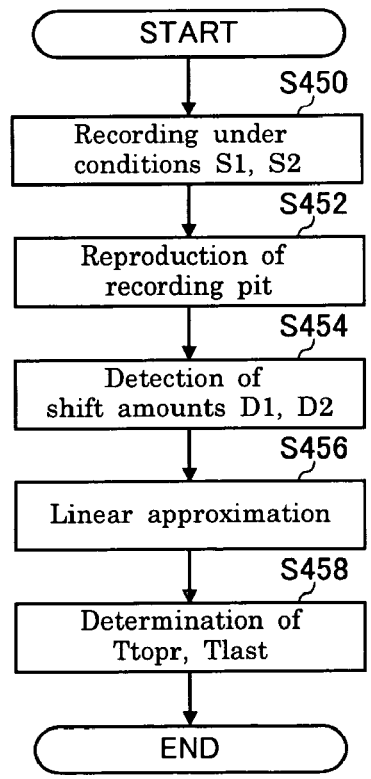
FIG. 42 is a flow chart illustrating an execution procedure of the determination of Ttopr and Tlast by predicting a control amount shown in FIG. 35.

FIG. 42 is a flow chart illustrating an execution procedure of the determination of Ttopr or Tlast by the prediction of a control amount shown in FIG. 35. As shown in FIG. 42, the prediction of a control amount is implemented in such a way that test recording is first implemented under at least two different conditions S1 and S2 (step S450), then the recording pits are reproduced (step S452), subsequently a shift amount D1 for the condition S1 and a shift amount D2 for the condition S2 are obtained by comparing the reproduced patterns (step S454), then the relationship between (S1, D1) and (S2, D2) is linearly approximated (step S456) and an optimum Ttopr or Tlast is finally determined by using the approximated line (step S458).

Figure 43:
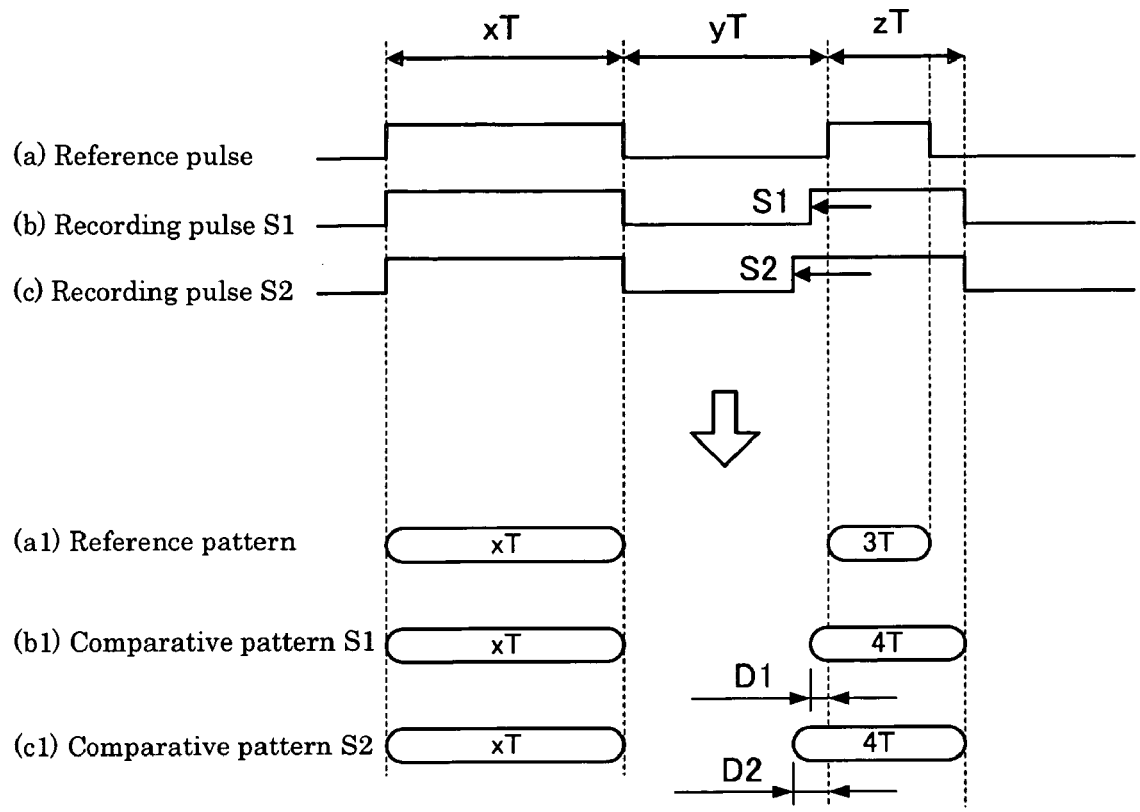
FIG. 43 is a conceptual diagram illustrating the relationship between the variation in recording condition, S1 to S2, and the variation in shift amount, D1 to D2.

FIG. 43 is a conceptual diagram illustrating the relationship between the variation in recording condition from S1 to S2 and the variation in shift amount from D1 to D2. A recording pulse shown in the diagram (a) is used as a reference pulse having "PzT=3T", and recording pulses S1 and S2, of which front edges of PzTs are shifted by amounts of S1 and S2 respectively as shown in the diagrams (b) and (c), are used as comparative recording pulses having "PzT=4T". Then, test recording is implemented using these recording pulses.

As a result of the test recording, a reference pattern shown in FIG. 43 (a1) is obtained for the recording pulse shown in (a), a comparative pattern S1 shown in (b1) for the recording pulse shown in (b) and a comparative pattern S2 shown in (c1) for the recording pulse shown in (c). In the comparative pattern S1, a shift amount of D1 arises from the control amount of S1 as well as a shift amount of D2 arises in the comparative pattern S2 from the control amount of S2.

If the values of the shift amounts D1 and D2 for the control amounts S1 and S2 are known, the relationship between a shift amount and a control amount for any of the parameters will be predictable. Hence, using the relationship between the variation in control amount and the variation in shift amount, the prediction of a control amount and the determination of a correction value will be implemented below.

Figure 44:
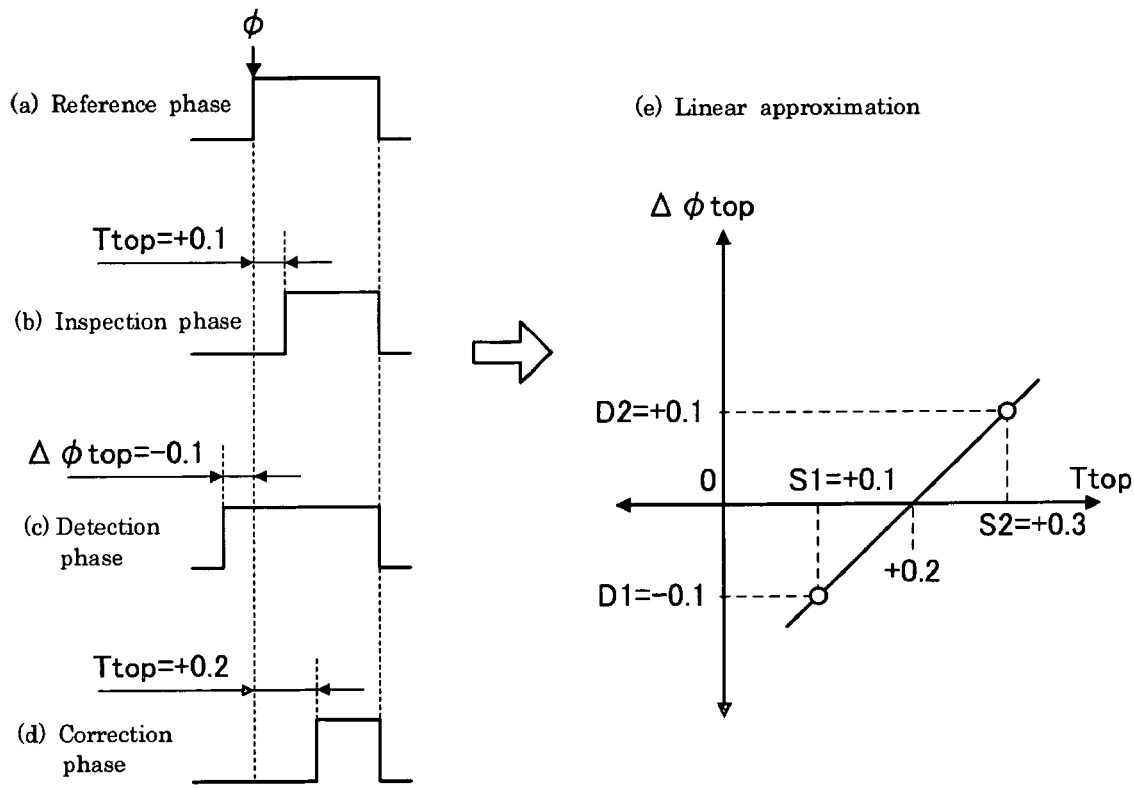
FIG. 44 is a conceptual diagram illustrating one example of a correction for a phase shift on the front side of a pit using a linear approximation.

FIG. 44 is a conceptual diagram illustrating one example of a correction for a phase shift on the front side of a pit using a linear approximation. When determining a correction amount Ttop for a phase shift on the front side of a pit, test recording is implemented with a pulse having a top position shifted by an amount of Ttop as shown in the diagram (b) relative to a reference phase φ shown in the diagram (a), which is a reference pulse position (equivalent to a test condition S1 or S2). As a result of reproducing the test recording, a phase shift Δφtop of the reproduced signal is detected as shown in the diagram (c) (equivalent to a shift amount D1 or D2).

In the example, two different phase shift amounts Δφtop are obtained as D1=−0.1 and D2=+0.1 for two different Ttop values S1=+0.1 and S2=+0.3 respectively, and therefore the relationship between the phase shift amount Δφtop, i.e., a controlled results, and the control amount Ttop can be obtained by a linear approximation using S1, S2, D1 and D2. As a result, by using the line approximated, a correction amount of Ttop=+0.2, which can cancel a phase shift, can be determined as an optimum correction amount.

As just described, because the relationship between the variation in strategy from S1 to S2 and the variation in shift amount from D1 to D2 can be obtained by a linear or curve approximation if at least two different points are obtained for each of the variations, an optimum correction amount leading to a zero shift amount can be obtained by using the approximated line or curve.

More specifically, some shift amounts D are first obtained while varying a strategy S. Then, substituting each of the shift amounts D obtained and a corresponding strategy S into a general expression "D=a×S+b" leads to simultaneous equations. By solving the simultaneous equations, constants a and b in the expression are evaluated, resulting in obtaining an optimum strategy S for an ideal shift amount. Finally, by setting the optimum strategy S to the strategy circuit 102 shown in FIG. 2, a recording pulse can optimally be corrected.

For example, in case that a shift amount detected from a reproduced pattern for test recording with some strategy S1 and another shift amount detected from a reproduced pattern for test recording with another strategy S2 in the recording shift detection part 112 shown in FIG. 2 are D1 and D2 respectively, the following simultaneous equations are obtained:

$D1 = a \times S1 + b,$ $D2 = a \times S2 + b.$

From the above equations, constants a and b are evaluated and the following function using the constants a and b evaluated is derived:

$S = (D - b)/a.$

By substituting a value to improve recording quality, for example, an output shift amount D to correct for an initial output shift or the like arising in an equalizer or the like, into the above function, an optimum strategy S can be determined.

In addition, the function to obtain an optimum strategy S may be derived for each of the pits P3T, P4T, . . . and P14T corresponding to 3T, 4T, . . . and 14T respectively. Also the function to obtain an optimum strategy S may be derived for each recording rate.

Figures 45, 46:
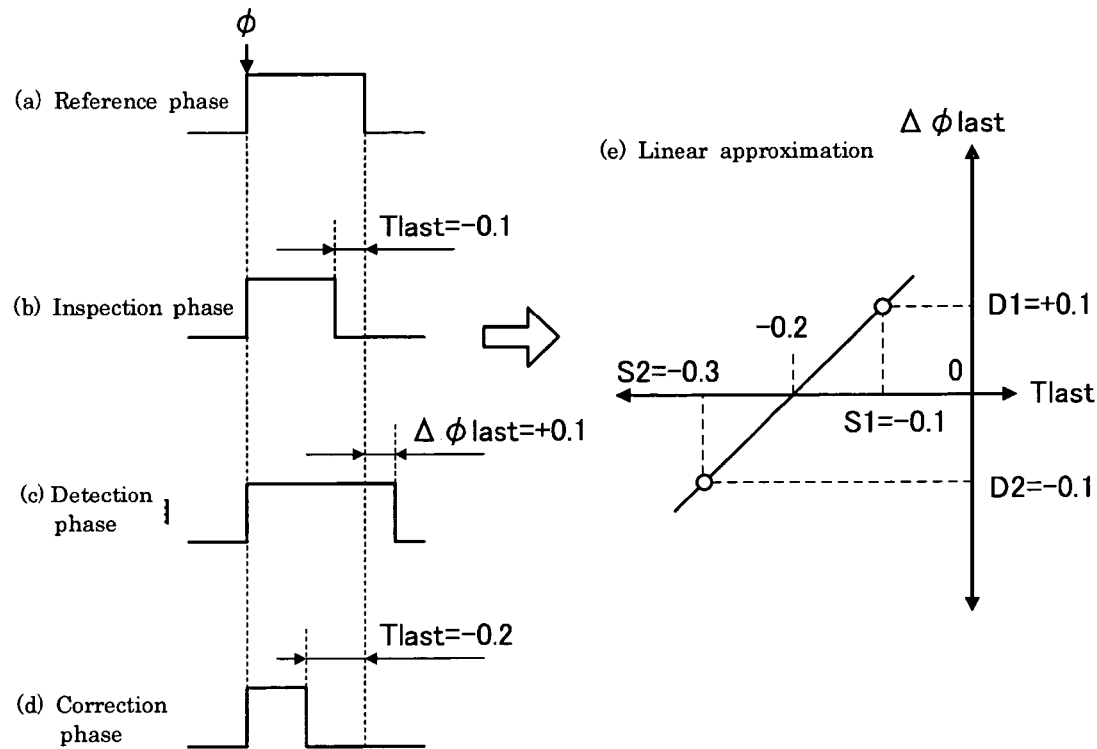
FIG. 45 is a conceptual diagram illustrating one example of a correction for a phase shift on the rear side of a pit using a linear approximation.
FIG. 46 is a conceptual diagram illustrating a table configuration for storing correction amounts Ttop and Tlast.

FIG. 45 is a conceptual diagram illustrating one example of a correction for a phase shift on the rear side of a pit using a linear approximation. When determining a correction amount Tlast for a phase shift on the rear side of a pit, test recording is implemented with a pulse having an end position shifted by an amount of Tlast as shown in the diagram (b) relative to a reference phase φ shown in the diagram (a), which is a reference pulse position. As a result of reproducing the test recording, a phase shift Δφlast of the reproduced signal is detected as shown in the diagram (c).

In the example, two different phase shift amounts Δφlast are obtained as D1=+0.1 and D2=−0.1 for two different Tlast values S1=−0.1 and S2=−0.3 respectively, and the relationship between the phase shift amount Δφlast, i.e., a controlled results, and the control amount Tlast can be obtained by a linear approximation using S1, S2, D1 and D2 as shown in the diagram (e). As a result, by using the line approximated, a correction amount Tlast=−0.2, which can cancel a phase shift, can be determined as an optimum correction amount.

FIG. 46 is a conceptual diagram illustrating a table configuration for storing correction amounts Ttop and Tlast. As shown in the diagram (a), the correction amount Ttop is determined for the length of each pit to be corrected in combination with the length of a land immediately before the pit. For example, in the case that the length of a pit to be corrected is 3T and the length of a land immediately before the pit is 3T, a correction amount is stored in the region indicated by "3-3" in the diagram (a), and similarly a correction amount is stored in the region indicated by "3-4" in the case that the length of a pit to be corrected is 4T and the length of a land immediately before the pit is 3T. In any other case of 5T to 14T, a correction amount is stored in the same manner as the case of 3T or 4T.

Also as shown in the diagram (b), the correction amount Tlast is determined for the length of each pit to be corrected in combination with the length of a land immediately after the pit. For example, in the case that the length of a pit to be corrected is 3T and the length of a land immediately after the pit is 3T, a correction amount is stored in the region indicated by "3-3" in the diagram (b), and similarly a correction amount is stored in the region indicated by "3-4" in the case that the length of a pit to be corrected is 4T and the length of a land immediately after the pit is 3T. In any other case of 5T to 14T, a correction amount is stored in the same manner as the case of 3T or 4T.

FIG. 47 is a conceptual diagram illustrating various single pulses after corrections. When recording data shown in the diagram (a) is recorded onto an optical disc, a strategy is set, wherein an optimum correction value is applied to each pit length. For example, in the case of recording a 3T pit, a front side correction value Ttop for the 3T pit is read out according to a land length immediately before the pit from the table shown in FIG. 46 as well as reading out a rear side correction value Tlast for the 3T pit according to a land length immediately after the pit, and then the front side and the rear side of the recording pulse are corrected using the Ttop and the Tlast respectively.

In the case of the correction for a pit having a length equal to 4T or more, a PWD correction value for the length of the pit is read out from the table shown in FIG. 32 in addition to reading out Ttop and Tlast, and then a shape of the pulse is corrected according to the PWD value as shown in FIGS. 47 (c) to (f).

FIG. 48 is a conceptual diagram illustrating various multi-pulses after corrections. In the case of a multi-pulse, a Tmp correction value is read out from the table shown in FIG. 32 instead of reading out a PWD correction value in the case of a single pulse described above, and then a shape of the multi-pulse is corrected according to the Tmp value as shown in FIG. 48 (c) to (f). The other corrections are implemented in the same manner as the single pulse case.

In the embodiments described above, an optimum strategy S is determined by substituting a shift amount D into a function for obtaining the optimum strategy S; however, the strategy S may be determined based on a correction table obtained using the function.

Also, the above optimum strategy S may be set whenever the type of an optical disc is changed or whenever a recording rate is varied. Furthermore, an optimum strategy condition is stored in a memory for every optical disc type used in the past or for every recording rate used in the past, and then the optimum strategy may be read out from the memory and used when recording with the optical disc type or when recording with the recording rate.

According to the present invention, a recording condition closer to an optimum condition can be obtained even for a medium unknown to a drive, and therefore it is expected to cope with a severer recording environment.

What is claimed is:

1. An optical information recording apparatus for recording information onto an optical recording medium comprising:
   a laser configured to irradiate said optical recording medium with a recording pulse comprising a top pulse and a following pulse; and
   strategy determination means configured to determine a condition of the top pulse by test recording onto the optical recording medium, wherein the top pulse is corresponding to a shortest pit having shortest data length, and to determine a condition of the following pulse by additional test recording under the condition of the top pulse.

2. The optical information recording apparatus as claimed in claim 1, wherein said strategy determination means is configured to perform an inspection of recording quality by test recording onto the optical recording medium and to determine a condition of the top pulse while varying a recording condition based on a result of the inspection.

3. The optical information recording apparatus as claimed in claim 1 comprising:
   means for determining a phase condition of the recording pulse by test recording under the conditions of the top pulse and the following pulse.

4. An optical information recording apparatus for recording information onto an optical recording medium comprising:
   a reference clock outputting a signal with a predetermined period,
   a laser configured to irradiate said optical recording medium with a recording laser pulse train based on said predetermined period; wherein the recording pulse train comprises an mT pulse having a shortest length of m'T in the recording pulse train and an nT pulse having a length of n'T defined by the following expression:

$n'T = m'T + (n-m)T,$ where T represents the clock period, m' the. clock number of the shortest pulse, n' the clock number of the given pulse, m the clock number of the shortest pit. n the clock number of a pit longer than the shortest pit, mT the data length of the shortest pit, and nT the data length of a pit longer than the shortest pit;

strategy determination means configured to determine a recording condition of the nT pulse by test recording onto the optical information medium by implementing the steps of:
(1) determining a condition of the mT pulse,
(2) determining an m'T/(n −m)T ratio, and
(3) determining a condition of the nT pulse; and
whereby the recording of information is implemented by the use of the mT pulse and the nT pulse determined through the steps.

5. An optical information recording apparatus for recording information onto an optical recording medium comprising:

a laser configured to irradiate said optical recording medium with a recording laser pulse train based on a unit time length reference; wherein the recording pulse train comprises an mT pulse having a shortest length of m'T in the recording pulse train and an nT pulse having a length of n'T defined by the following expression:

$$n'T = m'T + (n-m)T,$$

where T represents the clock period, m' the clock number of the shortest pulse, n' the clock number of the given pulse, m the clock number of the shortest pit n the clock number of a pit longer than the shortest pit, mT the data length of the shortest pit, and nT the data length of a pit longer than the shortest pit;

strategy determination means configured to determine a recording condition of the nT pulse by test recording onto the optical information medium by implementing the steps of:
(1) determining a condition of the mT pulse,
(2) determining an m'T/(n −m)T ratio, and
(3) determining a condition of the nT pulse; and
whereby the recording of information is implemented by the use of the mT pulse and the nT pulse determined through the steps.

6. An optical information recording method for recording information onto an optical recording medium, said method comprising:

irradiating said optical recording medium with one or more laser beam recording pulses comprising a top pulse and a following pulse;
determining a condition of the top pulse by test recording onto the optical recording medium wherein the top pulse is corresponding to a shortest pit having shortest data length; and
determining a condition of the following pulse by additional test recording under the condition of the top pulse.

7. A processing circuit incorporated into an optical information recording apparatus configured to irradiate said optical recording medium with a recording pulse comprising a top pulse and a following pulse for recording information onto an optical recording mediums said processing circuit comprising strategy determination means configured to determine a condition of the top pulse by test recording onto the optical recording medium, wherein the top pulse is corresponding to a shortest pit having shortest data length and to determine a condition of the following pulse by additional test recording under the condition of the top pulse.

* * * * *

UNITED STATES PATENT AND TRADEMARK OFFICE
CERTIFICATE OF CORRECTION

| | |
|---|---|
| PATENT NO. | : 7,496,014 B2 |
| APPLICATION NO. | : 11/181720 |
| DATED | : February 24, 2009 |
| INVENTOR(S) | : Sekiguchi et al. |

It is certified that error appears in the above-identified patent and that said Letters Patent is hereby corrected as shown below:

At Column 34, Line 27, please delete "mediums" and insert therefore, --medium,--.

At Column 34, Line 31, after "length" please insert --,--.

Signed and Sealed this

Eleventh Day of August, 2009

David J. Kappos
*Director of the United States Patent and Trademark Office*